(12) United States Patent
Robell et al.

(10) Patent No.: US 11,917,733 B2
(45) Date of Patent: *Feb. 27, 2024

(54) LIGHTING ARRAY FOR VARIOUS PLANT GROWTH STAGES

(71) Applicant: Maui Greens, Inc., Kula, HI (US)

(72) Inventors: Kevin Robell, Kula, HI (US); Matthew Ryan Montgomery, Los Angeles, CA (US); Neil Yorio, Indian Harbour Beach, FL (US)

(73) Assignee: MAUI GREENS, INC., Kula, HI (US)

(*) Notice: Subject to any disclaimer, the term of this patent is extended or adjusted under 35 U.S.C. 154(b) by 0 days.

This patent is subject to a terminal disclaimer.

(21) Appl. No.: 17/576,132

(22) Filed: Jan. 14, 2022

(65) Prior Publication Data

US 2022/0232679 A1 Jul. 21, 2022

Related U.S. Application Data

(60) Provisional application No. 63/252,533, filed on Oct. 5, 2021, provisional application No. 63/252,525, filed
(Continued)

(51) Int. Cl.
*H05B 45/30* (2020.01)
*H05B 45/10* (2020.01)
(Continued)

(52) U.S. Cl.
CPC .............. *H05B 45/30* (2020.01); *A01G 7/045* (2013.01); *F21V 23/0478* (2013.01);
(Continued)

(58) Field of Classification Search
CPC . A01G 7/045; F21V 23/0478; F21Y 2105/12; F21Y 2115/10; H05B 45/10; H05B 45/20; H05B 45/30; H05B 47/105
See application file for complete search history.

(56) References Cited

U.S. PATENT DOCUMENTS 4,505,068 A 3/1985 Kaneko
5,022,182 A 6/1991 Anderson
(Continued)

FOREIGN PATENT DOCUMENTS

CN 203646206 U * 6/2014
CN 203646206 U 6/2014
(Continued)

OTHER PUBLICATIONS

Machine Translation CN203646206U (Year: 2014).*
(Continued)

*Primary Examiner* — Raymond R Chai
(74) *Attorney, Agent, or Firm* — Rowan TELS LLC

(57) ABSTRACT

A lighting array and a method of using the same facilitate a lighting strategy that dynamically provides the photosynthetic photon flux density needed by a plant throughout its stages of growth while reducing power loss and waste caused by providing excess light during all stages of plant growth. LED placement patterns may be used to form a number of lighting channels on an LED board or an array of LED boards. These lighting channels may be individually controlled such that the ON/OFF state, intensity, and wavelength, of a plurality of LEDs may be adjusted to provide variable illumination levels and wavelengths of light customized for attributes of the plants being illuminated, such as their stage of growth, size, type, and/or shape.

18 Claims, 18 Drawing Sheets

Related U.S. Application Data on Oct. 5, 2021, provisional application No. 63/138,389, filed on Jan. 15, 2021, provisional application No. 63/138,391, filed on Jan. 15, 2021.

(51) Int. Cl.
  *H05B 45/20* (2020.01)
  *A01G 7/04* (2006.01)
  *F21V 23/04* (2006.01)
  *H05B 47/105* (2020.01)
  *F21Y 115/10* (2016.01)

(52) U.S. Cl.
  CPC ............. *H05B 45/10* (2020.01); *H05B 45/20* (2020.01); *H05B 47/105* (2020.01); *F21Y 2115/10* (2016.08)

(56) References Cited

U.S. PATENT DOCUMENTS

| | | | |
|---|---|---|---|
| 5,212,904 A | 5/1993 | Green et al. | |
| 5,557,881 A | 9/1996 | Bouldin et al. | |
| 6,973,885 B2 | 12/2005 | Fulgham | |
| 9,345,201 B2 | 5/2016 | Sakura et al. | |
| 10,939,623 B2 | 3/2021 | Miyahara et al. | |
| 11,483,988 B2 | 11/2022 | Bertram et al. | |
| 11,533,858 B2 | 12/2022 | Laeske | |
| 11,589,520 B2 | 2/2023 | Ingram-Tedd et al. | |
| 11,617,309 B2 | 4/2023 | Spiro | |
| 11,622,512 B2 | 4/2023 | Chong et al. | |
| 11,684,025 B2 | 6/2023 | Ouammi et al. | |
| 11,723,318 B2 | 8/2023 | Rubin et al. | |
| 11,778,957 B2 | 10/2023 | Jung et al. | |
| 2004/0049974 A1 | 3/2004 | Poirier et al. | |
| 2008/0110088 A1 | 5/2008 | Brusatore | |
| 2012/0060416 A1 | 3/2012 | Brusatore | |
| 2012/0124904 A1 | 5/2012 | Marchildon | |
| 2012/0218750 A1 | 8/2012 | Klase et al. | |
| 2012/0324788 A1 | 12/2012 | Sakura et al. | |
| 2013/0127329 A1 | 5/2013 | Komada et al. | |
| 2014/0366443 A1 | 12/2014 | Brusatore | |
| 2015/0027049 A1 | 1/2015 | Bijl et al. | |
| 2015/0223418 A1 | 8/2015 | Collins et al. | |
| 2016/0295820 A1 | 10/2016 | Aykroyd et al. | |
| 2017/0099791 A1 | 4/2017 | Joseph et al. | |
| 2017/0135290 A1* | 5/2017 | Sahni ..................... F21V 23/02 |
| 2018/0035625 A1 | 2/2018 | Lindbo et al. | |
| 2018/0235156 A1 | 8/2018 | Blair et al. | |
| 2018/0359938 A1 | 12/2018 | Millar et al. | |
| 2019/0133063 A1 | 5/2019 | Bateman et al. | |
| 2019/0159415 A1 | 5/2019 | Bertram et al. | |
| 2019/0191517 A1 | 6/2019 | Adams et al. | |
| 2019/0246571 A1 | 8/2019 | Ingram-Tedd et al. | |
| 2019/0380283 A1 | 12/2019 | Chong | |
| 2020/0214228 A1 | 7/2020 | Cho et al. | |
| 2020/0229357 A1 | 7/2020 | Spiro | |
| 2020/0236883 A1* | 7/2020 | Ambrosi ................ A01G 9/143 |
| 2020/0260673 A1 | 8/2020 | Travaglini | |
| 2020/0281129 A1 | 9/2020 | Anderson et al. | |
| 2020/0367455 A1 | 11/2020 | Vesty | |
| 2020/0383277 A1 | 12/2020 | Tyink | |
| 2021/0127593 A1* | 5/2021 | Krijn ...................... A01G 7/045 |
| 2021/0185937 A1* | 6/2021 | Ashdown ............. G02B 6/4249 |
| 2021/0259160 A1 | 8/2021 | Marder-Eppstein et al. | |
| 2022/0192114 A1 | 6/2022 | Lee et al. | |
| 2023/0148499 A1 | 5/2023 | Fujisawa et al. | |

FOREIGN PATENT DOCUMENTS

| | | | |
|---|---|---|---|
| CN | 111937731 A | 11/2020 | |
| WO | 2018208686 A1 | 11/2018 | |
| WO | 2019025317 A1 | 2/2019 | |
| WO | 2019074549 A1 | 4/2019 | |
| WO | 2020018993 A1 | 1/2020 | |
| WO | 2021055257 A1 | 3/2021 | |

OTHER PUBLICATIONS

U.S. Appl. No. 63/138,389, filed Jan. 15, 2021, Kevin Robell.
U.S. Appl. No. 63/236,512, filed Aug. 24, 2021, Kevin Robell.
U.S. Appl. No. 63/252,525, filed Oct. 5, 2021, Kevin Robell.
U.S. Appl. No. 63/252,533, filed Oct. 5, 2021, Kevin Robell.
PCT/US 22/12466_PCT_International Search Report and Written Opinion_06272022.
PCT/US2022/012451 International Search Report, Mar. 29, 2022 entire document.
PCT/US2022/012451 Written Opinion of the International Searching Authority, Mar. 29, 2022 entire document.
PCT/US2022/012483 International Search Report, Apr. 1, 2022 entire document.
PCT/US2022/012483 Written Opinion of the International Searching Authority, Apr. 1, 2022.
PCT/US2022/012547 International Search Report, Mar. 29, 2022 entire document.
PCT/US2022/012547 Written Opinion of the International Search Report, Mar. 29, 2022 entire document.
PCT/US2022/012574 International Search Report. Mar. 29, 2022 entire document.
PCT/US2022/012574 Written Opinion of the International Searching Authority, Mar. 29, 2022 entire document.

\* cited by examiner

EXEMPLARY ELECTRO-OPTICAL PERFORMANCE CHARACTERISTICS FOR A RECTANGULAR LED BOARD FOR USE DURING GERMINATION — 800

| Parameter | Symbol | Value | | | Unit | Mark |
|---|---|---|---|---|---|---|
| | | Min. | Typ. | Max. | | |
| Luminous Flux | $\Phi_v$ | 3580 | 3760 | - | lm | Channel 1 |
| | | 2370 | 2490 | - | | Channel 2 |
| Correlated Color Temperature | CCT | 3700 | 4000 | 4200 | K | E Rank |
| CRI | Ra | 80 | 82 | - | - | - |
| Forward Voltage | $V_{in}$ | 58.1 | 60.6 | 63.1 | Vdc | Channel 1 |
| | | 37.2 | 38.6 | 39.9 | | Channel 2 |
| Input Current | $I_F$ | - | 400 | - | mA | Channel 1 |
| | | - | 400 | - | | Channel 2 |
| Power consumption | P | 23.2 | 24.2 | 25.2 | W | Channel 1 |
| | | 14.9 | 15.4 | 16.0 | | Channel 2 |
| Viewing Angle | $2\Theta_{1/2}$ | - | 120 | - | deg. | - |

FIG. 8

LIGHTING ARRAY FOR VARIOUS PLANT GROWTH STAGES

CROSS-REFERENCE TO RELATED APPLICATIONS

This application claims the benefit of U.S. Provisional Patent Application No. 63/252,525, filed Oct. 5, 2021, the benefit of U.S. Provisional Patent Application No. 63/252,533, filed on Oct. 5, 2021, the benefit of U.S. Provisional Patent Application No. 63/138,391, filed on Jan. 15, 2021, and the benefit of U.S. Provisional Patent Application No. 63/138,389, filed on Jan. 15, 2021, each of which is incorporated herein by reference in its entirety.

BACKGROUND

Current methods of growing plants and seeds or seedlings poses numerous challenges. Plants grow at differing rates and need a combination of customized liquid, solid, and gaseous nutrients if they are to reach their full growth potential. The growth cycle of plants may be broadly categorized into three stages, viz., germination, nursery, and finishing. Each individual stage has its own requirement of nutrients, air, water, light, etc.

During each stage of plant growth, light bars have been conventionally used to provide light to the plants. However, such light bars generally provide a fixed illumination pattern, which may not be regulated. In other words, conventional light bars may not be controllable for optimization of light distribution during a plant's growth cycle. Such light bar mechanisms may shine light upon areas around the plant, where light may have no beneficial effect on the plant's grown, thus wasting power.

A need therefore exists for both a method and system for controlling illumination and light distribution during plant growth stages.

BRIEF SUMMARY

The disclosure describes a lighting array comprising a plurality of light emitting diodes (LEDs) for growing, maintaining, and shipping large quantities of plants. The disclosure further describes a method for using the lighting array, and a system comprising the lighting array.

In one aspect, a lighting array, includes at least one light emitting diode (LED) board including a plurality of LEDs, a plurality of LED placement patterns including groups of the plurality of LEDs, where each LED placement pattern is positioned to provide light to at least one plant, at least one lighting channel, where each LED placement pattern includes at least one LED associated with the at least one lighting channel, and power signal lines configured to drive the plurality of LEDs and control the at least one lighting channel of each LED placement pattern.

In one aspect, a method, includes receiving plant tissue size data from at least one plant. The method also includes providing a lighting array, the lighting array including a light emitting diode (LED) board including a plurality of LEDs, a plurality of LED placement patterns including groups of the plurality of LEDs, where each LED placement pattern is positioned to provide light to the at least one plant, at least one lighting channel, where each LED placement pattern includes at least one LED associated with the at least one lighting channel, and power signal lines configured to drive the plurality of LEDs and control the at least one lighting channel of each LED placement pattern. The method also includes providing a lighting array, the lighting array including providing a power supply sufficient to drive the plurality of LEDs and control the at least one lighting channel of each LED placement pattern. The method also includes providing a lighting array, the lighting array including providing a control circuit connected to the power supply, the control circuit configured to receive at least one plant characteristic parameter for at least one plant, and provide instructions to the power supply for controlling the at least one lighting channel in each LED placement pattern based on the at least one plant characteristic parameter. The method also includes providing a lighting array, the lighting array including determining a lighting strategy, the lighting strategy including how each lighting channel in each LED placement pattern may be controlled based on the plant tissue size data. The method also includes providing a lighting array, the lighting array including positioning the at least one plant under the lighting array. The method also includes providing a lighting array, the lighting array including instructing the control circuit to implement the lighting strategy.

In one aspect, a system, includes at least one lighting array includes at least one LED board including a plurality of LEDs, a plurality of LED placement patterns including groups of the plurality of LEDs, where each LED placement pattern is positioned to provide light to at least one plant, at least one lighting channel, where each LED placement pattern includes at least one LED associated with the at least one lighting channel, and power signal lines configured to drive the plurality of LEDs and control the at least one lighting channel of each LED placement pattern. The system also includes at least one lighting array includes at least one light tray, where the at least one lighting array is mounted on an underside of the at least one light tray. The system also includes at least one lighting array includes at least one power supply configured to selectively provide power to the power signal lines of the at least one lighting array. The system also includes at least one lighting array includes at least one control circuit connected to the at least one power supply, the control circuit configured to selectively instruct the power supply to provide the power to drive the at least one lighting channel in each LED placement pattern.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 8 illustrates exemplary electro-optical performance characteristics for a rectangular LED board for use during germination 800 in accordance with one embodiment.

DETAILED DESCRIPTION

Figure 1:
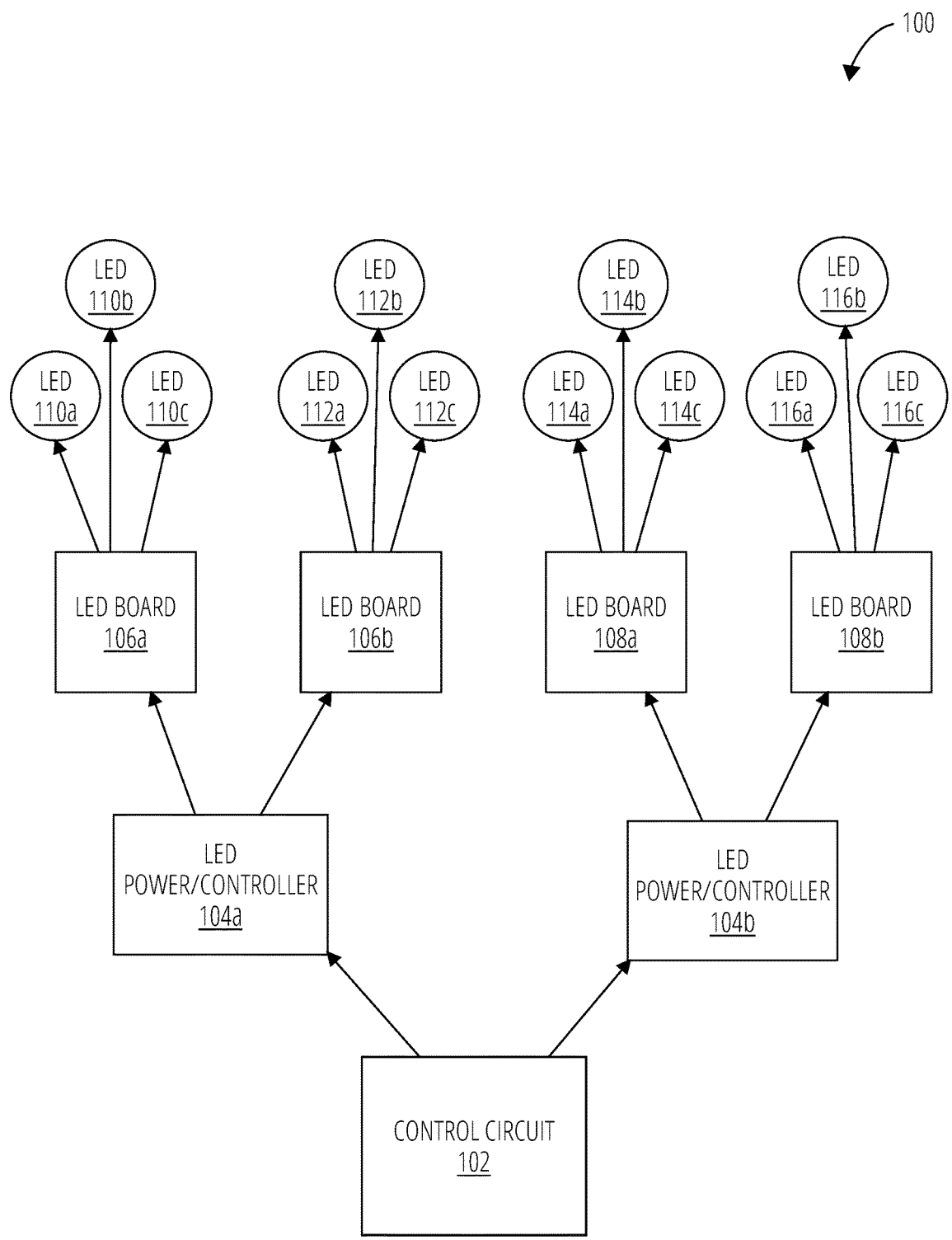
FIG. 1 illustrates a lighting array system 100 in accordance with one embodiment.

Disclosed is a lighting array and a method of using the same to facilitate a lighting strategy that dynamically provides the photosynthetic photon flux density needed by a plant throughout its stages of growth while reducing power loss and waste caused by providing excess light during all stages of plant growth. "Lighting array" in this disclosure refers to illumination facilitate plant growth, including but not limited to LEDs or other lighting encompassing a sufficiently wide range of wavelengths to emulate sunlight. LED placement patterns may be used to form a number of lighting channels on an LED board or an array of LED boards. These lighting channels may be individually controlled such that the ON/OFF state, intensity, and wavelength, of a plurality of LEDs may be adjusted to provide variable illumination levels and wavelengths of light customized for attributes of the plants being illuminated, such as their stage of growth, size, type, and/or shape. In particular, the size of the field of emitted light may be tailored to suit plant characteristic parameters, for example, plant tissue size data such that light is shone on plant tissue that may find light beneficial to its growth, and not on, for example, adjacent dirt, unpopulated portions of growing trays, etc. Other plant characteristic parameters may include plant shape and the plant variety, but are not limited thereto.

In one embodiment, control and adjustment of the lighting channels may be automated based on a time period elapsed from an initial seeding event. A first period of time after seeding may be expected to see the plant germinate from seed to seedling. This may be considered a germination stage. A second, subsequent period of time may see the seedling grow to a larger, more robust plant during its nursery stage. A period of time after that may be needed to see the plant through a finishing stage of growth, after which the plant may be ready to harvest. These stages of growth may vary by species or variety of plant and may depend on environmental conditions which may be controlled, as will be well understood by one skilled in the art. Thus lighting channel operation may be adjusted automatically along a set timeline for a particular plant variety in order to provide acceptable and not wasteful illumination based on an average expectation for plant growth.

In one embodiment, channels may be manually adjusted based on visual observation of plants in particular growing areas. When plants are moved from a seedling area where they passed their germination stage to a nursery area, different LED boards of different sizes, bearing different LEDs in different patterns may also be manually configured to utilize different lighting channels based on the size of the plants and their observed nursery stage growth.

In one embodiment, cameras and other sensors may be used to capture plant tissue size data and convert this data to electrical control signals that may automatically and dynamically provide light to the growing plants customized very granularly to the plant growth as detected by the sensors. For example, cameras trained on a tray of seedlings may detect when the seedlings first sprout. Illumination levels may be adjusted on a minute-to-minute basis based on the size of leaves or coverage of soil by leaves as detected by the camera. Soil temperature sensors may indicate when infrared LEDs might be turned on to help damp soil maintain a desired temperature.

In one embodiment, when seedlings first sprout, a lighting channel comprising a physically small array of closely clustered or optically directed LEDs may provide a focused light directly upon the detected seedlings. This light may be slowly increased and decreased to simulate the solar cycle of day and night. Or less intense light may be emitted for plant types that prefer shaded locations. LEDs may be turned ON and OFF to emit light or not, but many LEDs may also be incrementally brightened and dimmed through a number of techniques well understood in the art. For example, current levels may be increased for brighter light and decreased for dimmer light. In another example, a waveform signal that rapidly switches an LED between ON and OFF may be used. Such a signal having a higher duty cycle (such as one keeping the LED in the ON state 60% of the time) may result in a brighter light than a lower duty cycle signal (such one keeping the LED ON 40% of the time). During later stages of growth, as plant tissue expands, another channel may be used instead of or in addition to the first to direct more light across a broader physical area, so that a larger leaf area continues to receive an appropriate level of light per unit of area, or to dim light intensity cast upon leaves that are nearer to the LEDs due to growth and expansion. In addition, quickly toggling the LEDs may improve light absorption efficiency on a micro level. The receptors that translate light energy into storable chemical energy may become saturated under constant light and may be unable to process some of the photons into stored sugars, but may instead have to undergo an offloading or down period. By very rapidly toggling the LEDs off, the receptors may be able to accomplish their offloading during times when energy is not expended in generating photons, and may be able to avoid saturations states, thus both saving energy consumed by the LED boards and optimizing energy conversion efficiency. Some plants respond to lighting provided in strobed peaks at certain intervals. Thus lighting may be dimmed and intensified over a period of time, to provide such strobing peaks. These peaks may mimic the daylight cycle or have some other periodicity determined to be beneficial to plant growth.

In one embodiment, different lighting channels may implement a mix of LED colors such that different light wavelengths may be applied during different stages of growth. For example, red light may improve a plant's ability to germinate and flower, and so red LEDs may be included in lighting channels intended for use during germination and flowering. Blue light may improve chlorophyll production, resulting in greener leaves, so blue LEDs may be included in finishing stage channels intended for use when plants are going through their final leafing out. Green light may be employed in situations where reflection of light may be desired. Ultraviolet (UV) light, full spectrum light, weighted or unweighted (giving white light of differing warmth), far-red light, etc., may all have different effects on plant growth and might be employed in specific embodiments for specific desired results.

Additional measurable parameters may be considered in developing a lighting strategy. The distance between the light source (e.g., one or more LEDs) and the leaves the light falls upon may be accounted for in one embodiment. The lighting arrays may be raised or lowered in a position above the growing plants. In one embodiment, the lighting arrays may be placed beside the plants, illuminating them from the side, and also moved closer to or farther away from growing plants. In another embodiment, LEDs in an array may be dimmed in intensity as portions of the growing plant are detected to be nearer to that array, such that the growing leaves receive the same intensity of light as before, when they were farther away from the source. In one embodiment, a flexible or curvilinear board may be configured with lighting channels designed to provide incident light to a seedling in all directions, including to the underside of leaves if desired.

Light flux (otherwise known as luminous flux, measured in lumens as "lm"), or the total measure of light emitted by a light source, may be managed dynamically. Watts (energy) consumed in producing the light may be of particular concern. Irradiance (watts per meter squared or "$W/m^2$" may be a measurable datum of interest. The configuration of the growing area, the size of the plant, and the capabilities of the lighting channels may determine how appropriate values for these parameters are achieved throughout the application of the lighting strategy.

One method of achieving the desired lighting values may be using sine or square wave signals, or other waveforms. As discussed for dimming techniques above, waveform signals that rapidly toggle an LED between ON and OFF states, may be used to implement more granular control of peaks in light flux, irradiance, and power usage, as well as to minutely adjust the color of the composite light applied to a plant. Such signals may allow for highly tunable and customizable control over light emitted by the lighting channels with relatively low hardware complexity. In one embodiment, each LED in a lighting channel may be controlled individually. However, lighting channels may be configured to control several or many LEDs together to simplify design while still allowing a less minutely granular but still dynamically customizable lighting control.

"A power supply" refers to one or more electrical or other power sources capable of providing electrical power to at least one light emitting diode (LED).

"At least one sensor" refers to one or more sensing devices able to detect precise measurements of light, plant size, plant type, and/or plant shape.

"Camera" refers to one or more devices to capture still or video images under automated and/or manual control. Captured images may be digital files or images recorded by light onto film or similar media through a shutter and lens and chemically processed.

"Control system" refers to a device including a processor, logic, electrical wiring, and switches, for controlling other components or devices.

"Lighting channel" refers to a set of LEDs on an LED board that may be controlled separately from other LEDs on the LED board. For example, during germination, one control channel may comprise a small array of LEDs or a single LED at the center of the LED board intended to provide light at the center for a small seedling in the center of a growing area. An additional, more broadly arrayed set of LEDs may be controlled as another lighting channel, which may be intended to distribute light across a larger area such that as the seedling develops into a larger plant, more light is applied and the leaves continue to receive the same level of light energy as they grow and expand.

"Lighting strategy" refers to a comprehensive plan for applying the disclosed solution throughout the growth of a plant or set of plants in a manner to optimize plant growth for market-desirable traits, such as size, color, flower production, ratios of produce to non-produce portions of the plant, etc. A lighting strategy may include determining which phases of growth a plant is expected to experience, what light will be most beneficial during those stages, and how to configure the disclosed solution to implement the appropriate lighting parameters based on time elapsed from start, human observation, sensor data values, or some combination thereof.

"Plant" in this disclosure refers to a living organism of the kind exemplified by trees, shrubs, herbs, grasses, ferns, and mosses, typically growing in a permanent site, absorbing water and inorganic substances through its roots, and synthesizing nutrients in its leaves by photosynthesis. "Seed" in this disclosure refers to a flowering plant's unit of reproduction, capable of developing into another such plant. "Seedling" in this disclosure refers to a young plant, especially one raised from seed and not from a cutting. "Shoots of plants" in this disclosure refers to new growth from seed germination that grows upward and where leaves will develop. Shoots may also refer to stems including their appendages, the leaves and lateral buds, flowering stems and flower buds.

Referring to FIG. 1, a lighting array system 100 is illustrated. Embodiments of the lighting array system comprise a control circuit 102 to monitor and/or control various parameters during growth of plants. The lighting array system 100 may further comprise LED power/controllers 104a and 104b. Each of LED power/controller 104a/104b may be configured to control LEDs associated with one or more lighting channels (not shown). A lighting channel may be associated with one or more LEDs which are positioned to provide light to at least one plant. In an exemplary embodiment, LEDs 110a, 110b, and 110c may be associated with one lighting channel. Additionally, the LEDs 110a, 110b, and 110c may be arranged in one or more LED placement patterns on an LED board 106a. The LED power/controller 104a is configured to control LEDs 112a, 112b, and 112c, which may be arranged in another LED placement pattern on an LED board 106b. Similarly, the LED power/controller 104b is also configured to control LEDs 114a, 114b, 114c, 116a, 116b, and 116c which may be arranged in different LED placement patterns on LED boards 108a and 108b. In more complex and therefore more granularly customizable systems, Each LED board, lighting channel, or even LED may employ its own channel, or even its own control circuit, as may be well understood by one skilled in the art. The embodiment illustrated here may provide centralized control of multiple, individually controlled channels, and thus result in a simpler and less expensive configuration still providing customizable lighting.

Control Circuit

The control circuit 102 is configured to monitor and/or control various parameters during growth of plants. In one embodiment, the control circuit 102 may be coupled to multiple sensors, including a camera, (not shown) to receive inputs regarding the current stage of growth of plants, shape of plants, and/or type of plant under illumination by the controlled LEDs. These sensors may detect changes in plant size and composition in three dimensions, i.e., area covered by the plant looking down from a top view (in an x-axis and a y-axis) as well as the height of the plant (in a z-axis). In response to receiving these inputs regarding current stage of growth of plants, shape of plants, and/or type of plant, the control circuit 102 is configured to provide instructions to LED power/controllers 104a and 104b for controlling at least one lighting channel in each of the LED placement patterns. In other embodiments, the control circuit 102 may also provide instructions to control fans, nutrient supply, water supply, etc. for the growth of plants based on the received inputs. Such aspects are not discussed in detail and are already discussed in Provisional Patent Application Ser. No. 63/138,389, filed Jan. 15, 2021 and titled System for Fertigation of Charged Plant Vessel, which is incorporated by reference herein. The control circuit 102 may additionally be configured manually by an operator or by automated or manual means under control of software able to send and receive commands to and from the control circuit 102 via any means familiar to those skilled in the art. In an embodiment, the control circuit 102 may comprise at least a processor, a memory, suitable logic, circuitry, interfaces, and/or code that may be configured to execute a set of instructions stored in the memory to perform functions of the control circuit 102 as discussed herein. The control circuit 102 may be implemented, based on a number of processor technologies known in the art. Examples of the control circuit 102 may be an X86-based processor, a Reduced Instructions Set Computing (RISC) processor, an Application Specific Integrated Circuit (ASIC) processor, a Complex Instructions Set Computing (CISC) processor, a microcontroller, a central processing unit (CPU), a graphics processing unit (GPU), a state machine, and/or other processors or circuits.

LED Power/Controllers

The LED power/controllers 104a and 104b are configured to control LEDs associated with one or more lighting channels (not shown) of the LED boards discussed herein. The LED power controllers 104a and 104b may include a power supply configured to drive the plurality of LEDs and control the at least one lighting channel of each LED placement pattern. In an embodiment, controlling the LEDs via LED power/controllers 104a and 106a may comprise, but is not limited to, one or more of switching OFF, switching ON, and controlling intensity of the LEDs. Each of the LED power/controllers 104a and 104b may be configured to control one or a group of LEDs. In one embodiment, the LED power/controllers 104a and 104b may be coupled to multiple sensors (not shown) to receive inputs regarding current stage of growth of plants, shape of plants, and/or type of plant under illumination by the LEDs. In response to receiving the inputs regarding current stage of growth of plants, shape of plants, and/or type of plant, the LED power/controller 104a and 104b may control switching ON, switching OFF, intensity of lights, wavelength (color) of emitted light, etc., for further growth of the illuminated plants. The LED power/controllers 104a and 104b may additionally be configured manually by an operator or by automated or manual means under control of software able to send and receive commands to and from the LED power/controllers 104a and 104b via any means familiar to those skilled in the art. The LED power/controllers 104a and 104b may be implemented using similar components/circuitry as discussed above with respect to the control circuit 102.

The power supply used may be variable across a range from 0V to 10V in one embodiment. Control signals based on response of the control circuits to input signals may be used to adjust power levels such that the LEDs powered may be dimmed or brightened from their OFF to their fully ON state. Other analog signaling and power levels may be used, as well as digital signaling such as pulse width modulation, may be used in other embodiments, as may be well understood by one skilled in the art.

LED Board

In an embodiment, each of the LED boards 106a, 106b, 108a, and 108b comprises an aluminum base metal core printed circuit board (PCB). The top layer of the PCB comprises electronic traces. Additionally, connectors and power supply circuits are provided in the PCB for providing power to LEDs, as per the inputs received from the LED power/controllers 104a and 104b. Accordingly, the LED boards have control mechanism to switch OFF, switch ON, adjust the color of light emitted from the LEDs, and/or control the intensity of LEDs. The PCB may be a "sandwich board" type PCB, including a protective optic, creating a protective cavity to prevent the onboard components from being impacted by dirt and moisture in the growing areas. Metal layers within the PCB may be used dissipate heat from LEDs, and LEDs may be spaced appropriately to facilitate heat dissipation as will be well understood by one skilled in the art. Additional metal or composite heat transferring materials may be used to further facilitate heat dissipation. Fans deployed in the growing area for general air circulation may also play a part in dissipating the heat generated by the LEDs.

Each LED board includes one or more lighting channels to control one LED or a group of LEDs together. In an exemplary embodiment, the LED 110a may be associated with one lighting channel, while LEDs 110b and 110c may be associated with another lighting channel on the LED board 106a. In another exemplary embodiment, the LEDs 112a, 112b, and 112c may be associated with one single lighting channel on the LED BOARD 106b. In yet another embodiment, each LED may be associated with a different lighting channel. A group of LEDs associated with one lighting channel may be controlled together through the LED power/controller 104a and/or 104b, i.e., such a group of LEDs may be switched OFF, switched ON, dimmed, color-adjusted, or intensified together using one input.

In one embodiment, a single board may be allocated to a single plant and configured to optimally direct light for that one plant throughout its growth. In another embodiment, a board may be configured to illuminate a growing array of multiple smaller plants.

In an embodiment, each LED board may be configured for a specific stage of the growth or variety of the illuminated plants. For example, the LED board 106a may be configured for a germination stage of the plant growth, while the LED BOARD 108a may be configured for a finishing stage of the plant growth. The LED boards for different stages may be optimized to illuminate plants according to the requirements of the plants at each stage. The optimization may be in terms of, but not limited to, the LED placement pattern on the LED boards and/or number of channels to control the illumination of plants. In one embodiment, each LED placement pattern may match a corresponding stage of plant growth. For each stage of a plant (e.g., for finishing stage), there may be multiple LED placement patterns which are switched ON when the plant grows during that stage. These embodiments are explained in more detail later.

LEDs

Each of the LEDs 110a, 110b, 110c, 112a, 112b, 112c, 114a, 114b, 114c, 116a, 116b, and 116c is configured to provide lighting to facilitate growth of the plants. The LED boards comprising the LEDs may be located at an overhead location above the plants, such that the light from the LEDs is incident upon the plants. The LEDs may be placed in specific LED placement patterns such that maximum light is distributed over the plant tissues/leaves/shoots rather than the surrounding area of the plants, such as plant tray, pallet module surfaces, plant vessels. The LED placement patterns are discussed in more detail at least in conjunction with FIG. 2. In some embodiments, focusing elements may be deployed on some LEDs to provide very targeted light exposure. This may allow a greater number of LEDs to be spaced more closely for even more granular control.

Figure 2:
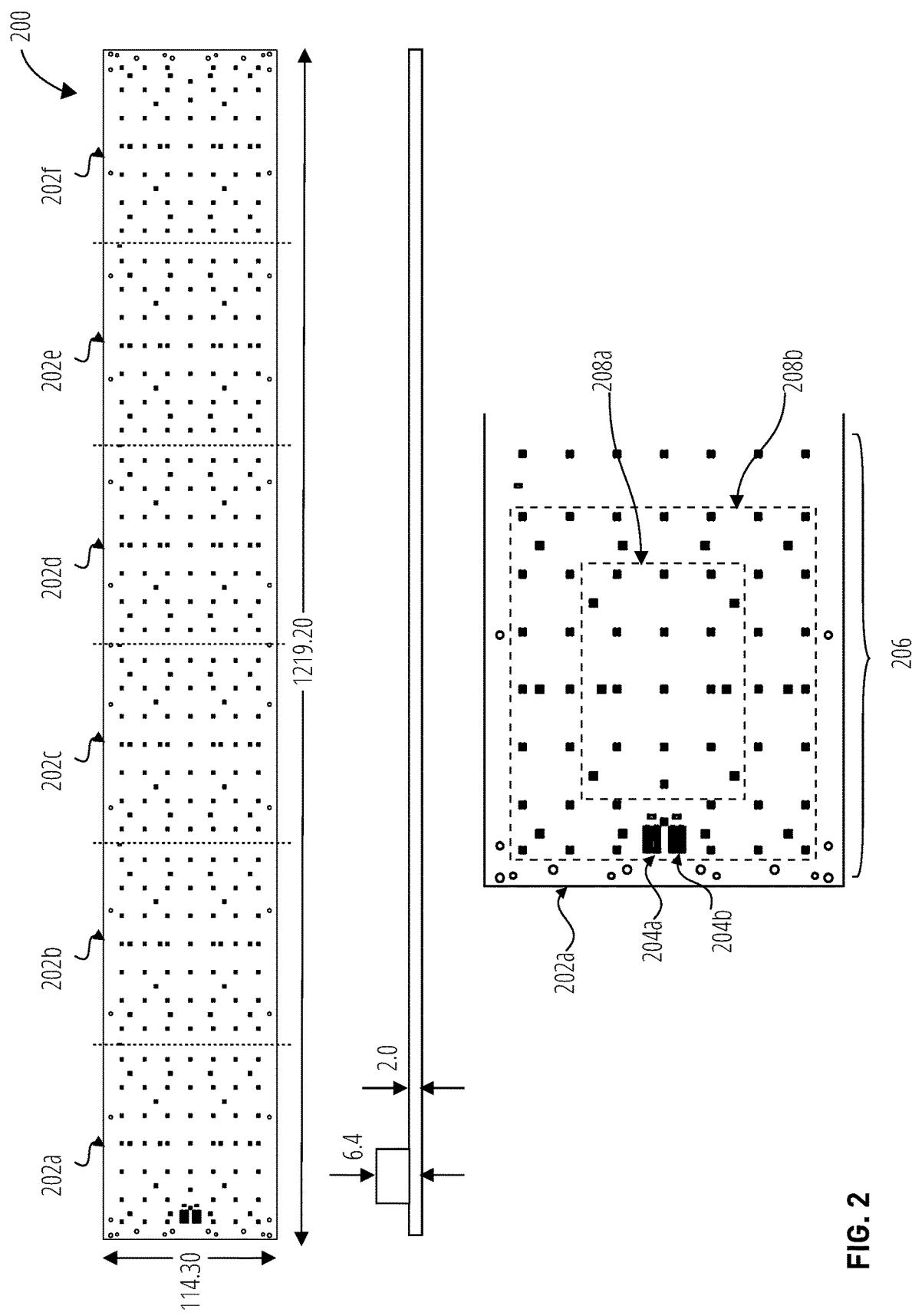
FIG. 2 illustrates an exemplary array of rectangular LED boards 200 in accordance with one embodiment.

Referring to FIG. 2, an exemplary array of rectangular LED boards 200 is illustrated. From the LED boards discussed above, one embodiment describes an array of LED boards 202a-202f. Each of the LED boards LED board 202a-202f comprises a a plurality of LEDs 206 arranged in a plurality of LED placement patterns for illuminating one or more plants. In one embodiment, the LED boards 202a-202f are placed at a location vertically above the plants, such that the LEDs of the LED placement patterns illuminate the plant tissues from the top. In another embodiment, the LED boards 202a-202f are placed at a location sideways from the plants, such that the LEDs of the LED placement patterns illuminate the plant tissues from the sides.

For a detailed explanation of LED boards 202a-202f, the LED board 202a is illustrated by LED board 202a in an enlarged view 202a. LED board 202a comprises two connectors 204a and 204b which correspond to two different LED placement patterns 208a and 208b. Each of LED placement pattern 208a and 208b corresponds to a different LED lighting channel. As illustrated, each of the LED placement patterns 208a and 208b comprises a group of LEDs to illuminate the plant(s) beneath or beside the LED board 202a. However, it may be apparent to one skilled in the art that one lighting channel may be associated with a single LED as well.

In one embodiment, each LED placement pattern comprises LEDs of different colors. For example, the LEDs may include one or more of red, blue, green, white, UV, far red, infrared, and tricolor or variable color LEDs. The LED placement pattern may correspond to at least one of a particular growth stage, tissue size of a plant, shape of plant, type of plant, etc. For example, at the germination stage of a plant, a single LED may be sufficient to provide light to the plant owing to its small size. Accordingly, a lighting channel comprising a single LED may be designed to distribute light to the plant at the germination stage. A particular plant type may grow better when infrared waves are combined with visible light waves, or a particular light color is applied at the finishing stage. During operation of the lighting array system discussed herein, once the tissue size of plant is determined (and hence, the stage of plant growth is determined) through an imaging system (discussed later herein), the lighting channel appropriate to the determined tissue size, growth stage, plant shape, and plant size may be turned on.

Figure 3:
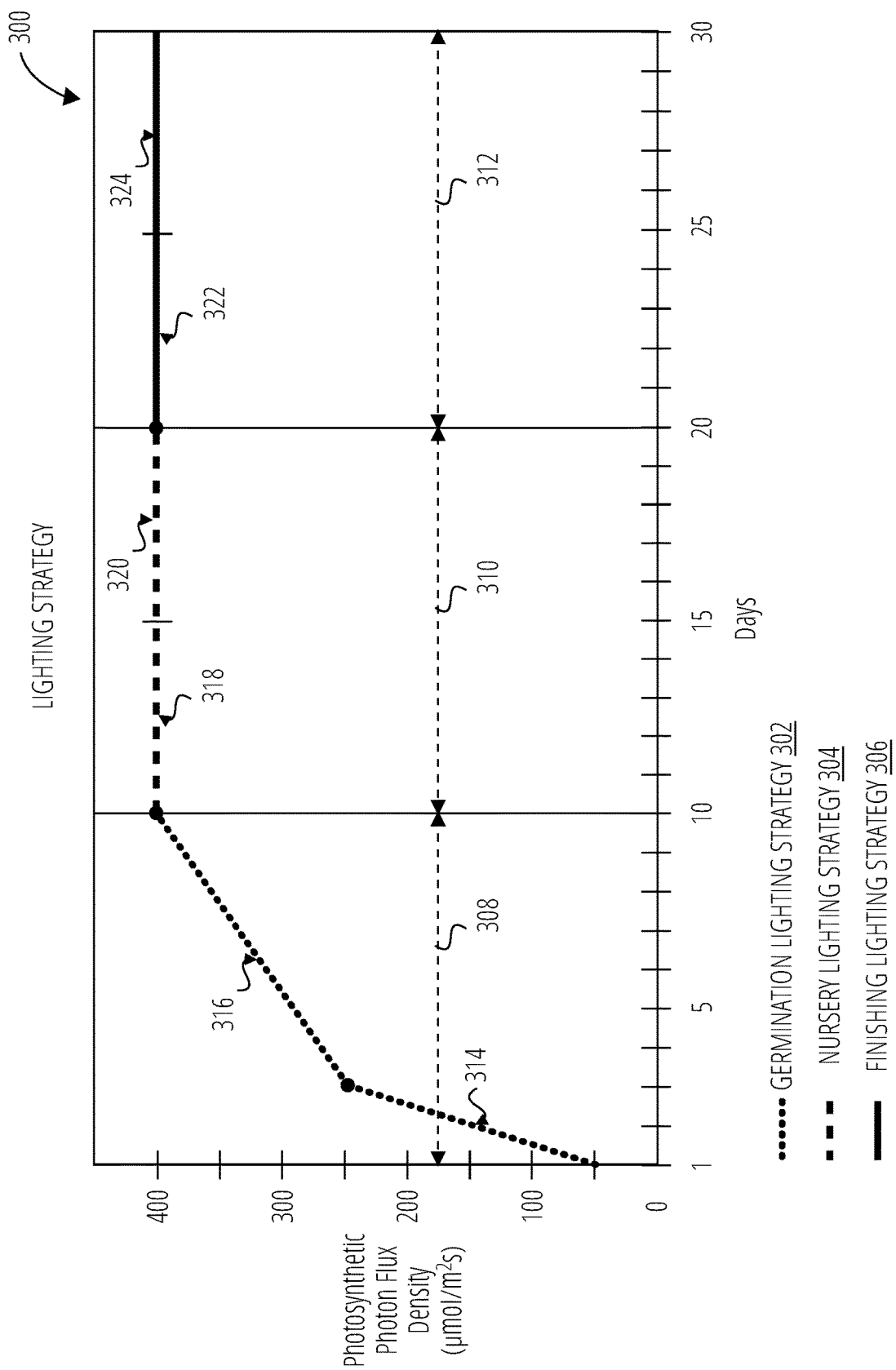
FIG. 3 illustrates a lighting strategy 300 in accordance with one embodiment.

Referring to FIG. 3, an exemplary lighting strategy 300 is illustrated in accordance with the lighting array of the current disclosure. The graph depicts a number of days of grown on the x-axis and photosynthetic photon flux density on the y-axis for an exemplary plant. Further, the lighting strategy 300 may be divided into and comprise a germination lighting strategy 302, a nursery lighting strategy 304, and a finishing lighting strategy 306. Plant growth may be divided into three broad stages, viz., germination stage 308, nursery stage 310, and finishing stage 312. Each stage may correspond to a number of days of plant growth. For example, as illustrated, the germination stage 308 may correspond to 1-10 days of plant growth, the nursery stage 310 may correspond to 10-20 days of plant growth, and the finishing stage 312 may correspond to 20-30 days of plant growth. The germination lighting strategy 302, nursery lighting strategy 304, and finishing lighting strategy 306 may be implemented during their respective stages of growth.

During each stage of plant growth, a specifically designed lighting channel and a corresponding LED placement pattern may be turned ON. In one embodiment, as illustrated, during germination stage 308, a first lighting channel, channel 1 (inner) 314 may be turned ON during days 1-3, while two lighting channels, channel 1 and 2 (inner and outer) 316, may be turned ON during days 3-10. In other words, a first LED placement pattern may be turned ON during a part of growth stage of the plant, while a different set of LED placement patterns (which may include the first LED placement pattern) may be turned ON during another part of growth stage of the plant. In one embodiment, the operation of lighting channels may further be based on the photon flux density most beneficial to the plant during that stage of plant growth.

Similarly, during the nursery stage 310 and finishing stage 312, the designated channels may be turned ON for an optimized distribution of light to facilitate plant growth. In one embodiment, channel 1 (inner) 318 may be turned on for the first part of the nursery stage 310, and channel 1 and 2 (inner and outer) 320 may be turned on for the second part. Similarly, channel 1 (all) 322 may be turned on for the first part of the finishing stage 312, and channel 1 and 2 (all and ultraviolet) 324 may be turned on for the final part of the finishing stage 312. In an embodiment, the second lighting channel for the finishing stage may comprise one or more ultraviolet (UV) LEDs for illumination with a different spectrum of light. This may be useful in optimizing leaf growth during the finishing stage.

Figure 4:
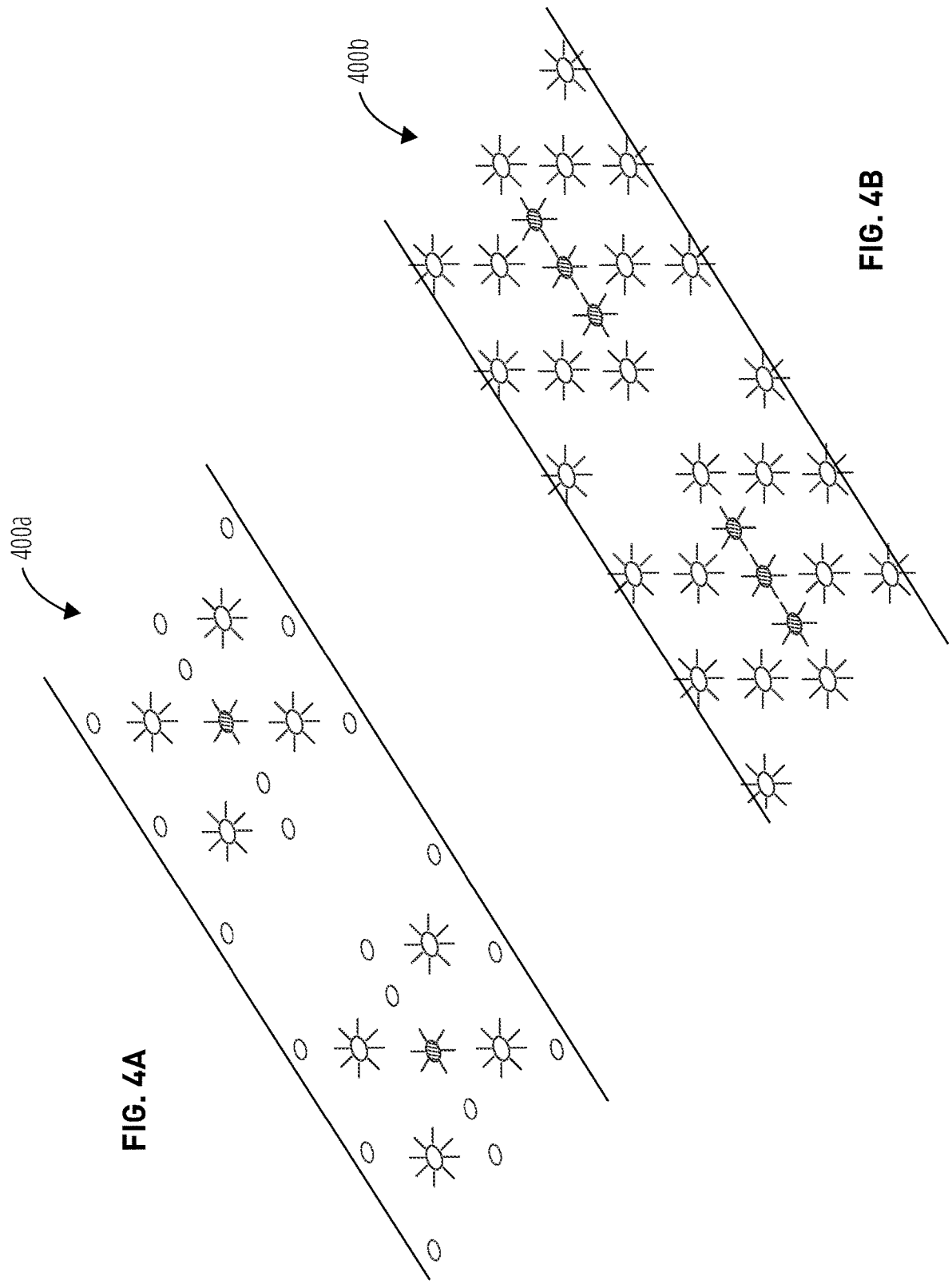
FIG. 4A illustrates an exemplary LED lighting strategy 400a implemented on an LED board in accordance with one embodiment.
FIG. 4B illustrates another exemplary LED lighting strategy 400b implemented on an LED board in accordance with one embodiment.

Referring to FIG. 4A, an exemplary LED lighting strategy 400a is illustrated. As discussed above with respect to FIG. 3, one LED lighting channel may be turned ON during a part of a plant growth stage, and a different set of LED lighting channels may be turned ON during another part of the plant growth stage. FIG. 4A depicts a first LED lighting channel being turned ON to focus on small tissue area during early growth stage of plant, e.g., days 1-3 of germination stage as depicted in FIG. 3. Accordingly, a group of inner LEDs corresponding to an LED placement pattern are turned ON during days 1-3 of the germination stage.

Referring to FIG. 4B, another exemplary LED lighting strategy 400b is illustrated where both first and second LED lighting channels may be turned ON to cover a wider tissue area of plant during the second part of a particular stage of plant growth, e.g., days 3-10 of the germination stage as depicted in FIG. 3. Accordingly, both inner and outer LEDs corresponding to two different lighting channels and two different LED placement patterns are turned ON during days 3-10 of the germination stage.

Figure 5:
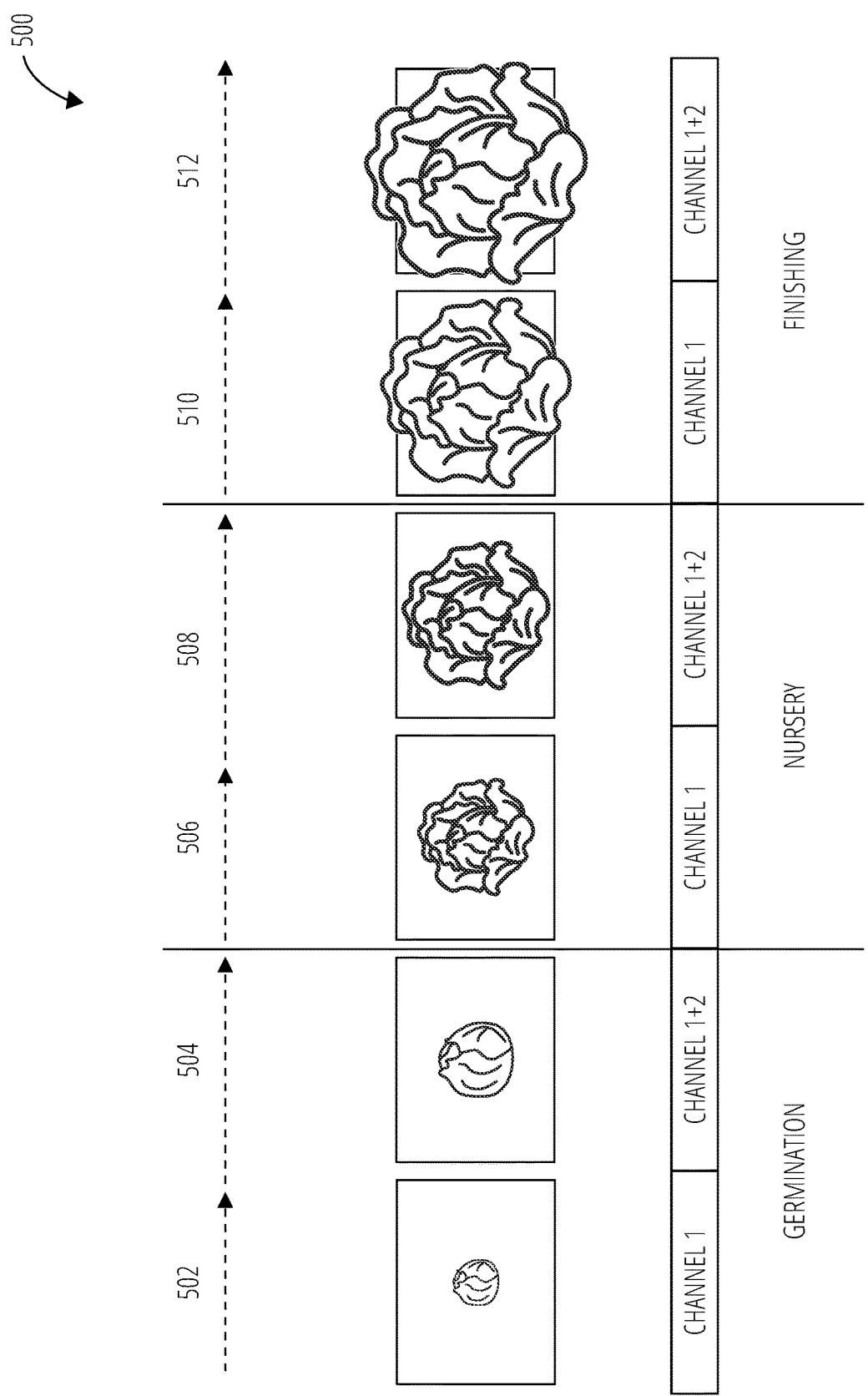
FIG. 5 illustrates an exemplary plant growth and associated lighting channels relationship 500 in accordance with one embodiment.

Referring to FIG. 5, an exemplary plant growth and associated lighting channels relationship 500 is illustrated. In this embodiment, three broad stages of growth are illustrated, viz., germination, nursing, and finishing. The plant tissue size data may be received from an imaging system during the plant growth. During a first part of the germination stage 502, for example, days 1-3 of the plant growth, a first lighting channel comprising a fewer LEDs associated with the first LED placement pattern may be switched ON. As depicted, the illumination based on the first group of LEDs is restricted to the plant growth area, and more specifically, the leaves of the plant. The imaging system may take high resolution still or video images of each plant, one or more times a day, at daily phases of growth. These images may be indexed according to the tray and module they pertain to, and the variety, age, and other metrics tracked in data for the plants being grown. The images may be used in numerous ways. Primarily, the images may be processed by multiple algorithms to assess plant health. For example, plant size at a given age may be compared to optimal plant size for plants of the same age and variety stored within a database. The resulting assessment may inform modifications in the concentration or quality of nutrients an imaged plant receives. Imaging may also be used to identify potential plant risks, such as pathogens, before they are visible to the naked eye, or to detect tissue characteristics associated with nutrient deficiency, environmental abnormalities, pests, etc. This imaging may be used to determine the exact shape and perimeter of the plant from an overhead or side perspective. This "footprint" of the plant may then be used to determine a lighting pattern that is ideal for the plant at any given age. This emulation of lighting patterns, according to the exact shape of the plant that the lights are illuminating, achieves maximum efficiency of lighting. The individual LED diodes needed to illuminate the plant may be activated while those that do not illuminate the plant at that size may be turned off. The distance between these diodes and the plant tissue may also dynamically adjusted based on the age and verticality of the plant. The "intensity" of each diode may also optimized (minimized) by the close proximity of the light to the tissue and the calculated intensity to achieve optimal aggregate daily light levels needed by each plant variety, at every stage of growth. The imaging system may also detect the successful or unsuccessful germination of each seed within the system. This may confirm the successful germination of each plant space, and may trigger the replacement of a failed germination, resulting in overall system efficiency. The imaging system may also be used for individual plant traceability throughout the production cycle for potential uses including but not limited to tracking quality, food safety, regulatory, or postproduction sales reference.

Once the received plant tissue size data corresponds to the second part of the germination stage 504 for the plant's growth, for example, during days 4-10 of the germination stage (when the shoot of the plant has surpassed a predefined threshold limit), both the first and second lighting channels may be switched ON. Accordingly, an additional second group of LEDs corresponding to the second LED placement pattern may also be switched ON. During the second part of the germination stage 504, the illumination is again restricted to the leaves of the plant during that part of the stage.

Similarly, the lighting channels or the LED placement patterns designated for the first part of the nursery stage 506, the second part of the nursery stage 508, the first part of the finishing stage 510, and the second part of the finishing stage 512 may be switched ON, individually or in a combination thereof, during the respective growth stages.

Figure 6:
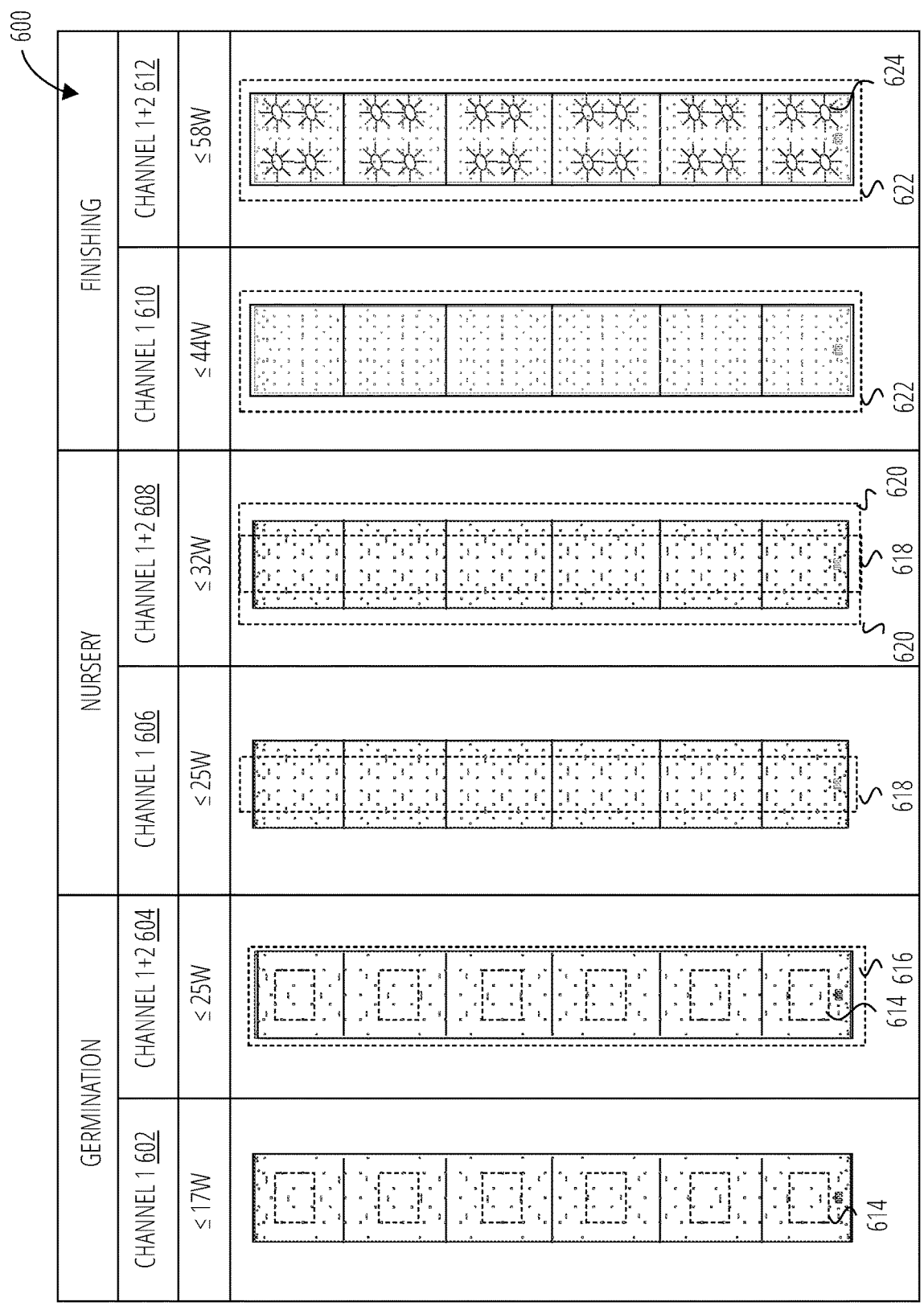
FIG. 6 illustrates an exemplary power chart 600 associated with the lighting channels during plant growth, in accordance with one embodiment.

Referring to FIG. 6, an exemplary power chart 600 associated with the lighting channels during plant growth is illustrated. In conjunction with FIG. 5, during the first part of the germination stage, the power output corresponding to the LEDs of the first germination lighting channel 602, controlling the inner germination LED placement pattern 614, may be less than or equal to 17 W by way of an example. This may correspond to a smaller number of LEDs being used to illuminate a smaller area because the plant is smaller. Further, during the second part of the germination stage, the power output corresponding to the LEDs of the first and second germination lighting channels 604 or the inner germination LED placement pattern 614 and the outer germination LED placement pattern 616 may be less than or equal to 25 W by way of an example.

Furthermore, during the first part of the nursery stage, the power output corresponding to the LEDs of the first nursery lighting channel 606, or the inner nursery LED placement pattern 618 may be less than or equal to 25 W. Additionally, during the second part of the nursery stage, the power output corresponding to the LEDs of the first and second nursery lighting channels 608 or the inner nursery LED placement pattern 618 and the outer nursery LED placement pattern 620 may be less than or equal to 32 W. This increase in wattage may correspond to adding additional LEDs to provide additional illumination as the plant continues to grow.

Also, during the first part of the finishing stage, the power output corresponding to the LEDs of the first finishing lighting channel 610, or the full canopy LED placement pattern 622 may be less than or equal to 44 W. This may reflect visible light coverage for a fully grown canopy, where more power is needed to illuminate a large array of LEDs to provide light to a large plant. Additionally, during the second part of the finishing stage, the power output corresponding to the LEDs of the first and second finishing lighting channels 612 or the full canopy LED placement pattern 622 and the ultraviolet LED placement pattern 624 may be less than or equal to 58 W. This may reflect the use of UV LEDs across the canopy of plant in addition to full visible light coverage of the canopy. Applying UV light during this stage may result in the development of red pigments in, for instance, a red lettuce plant, and so extra energy may be spent at this stage to improve the marketable features of a plant during its last stage of growth. The ratios of white to red and white and red to ultraviolet LEDs used in the LED placement patterns may be adjusted to accommodate the optimal growing conditions for different types of plants.

Thus a smaller wattage may be applied when plants are at a smaller stage of growth, allowing energy conservation, while increasing energy levels may be dynamically employed as plants grow, such that the energy needed to support growth may be provided based on stage of growth, and excess energy may be reserved during stages when it would not be beneficial. This is one example, and additional configurations may be employed as will be well understood by those skilled in the art.

Figure 7:
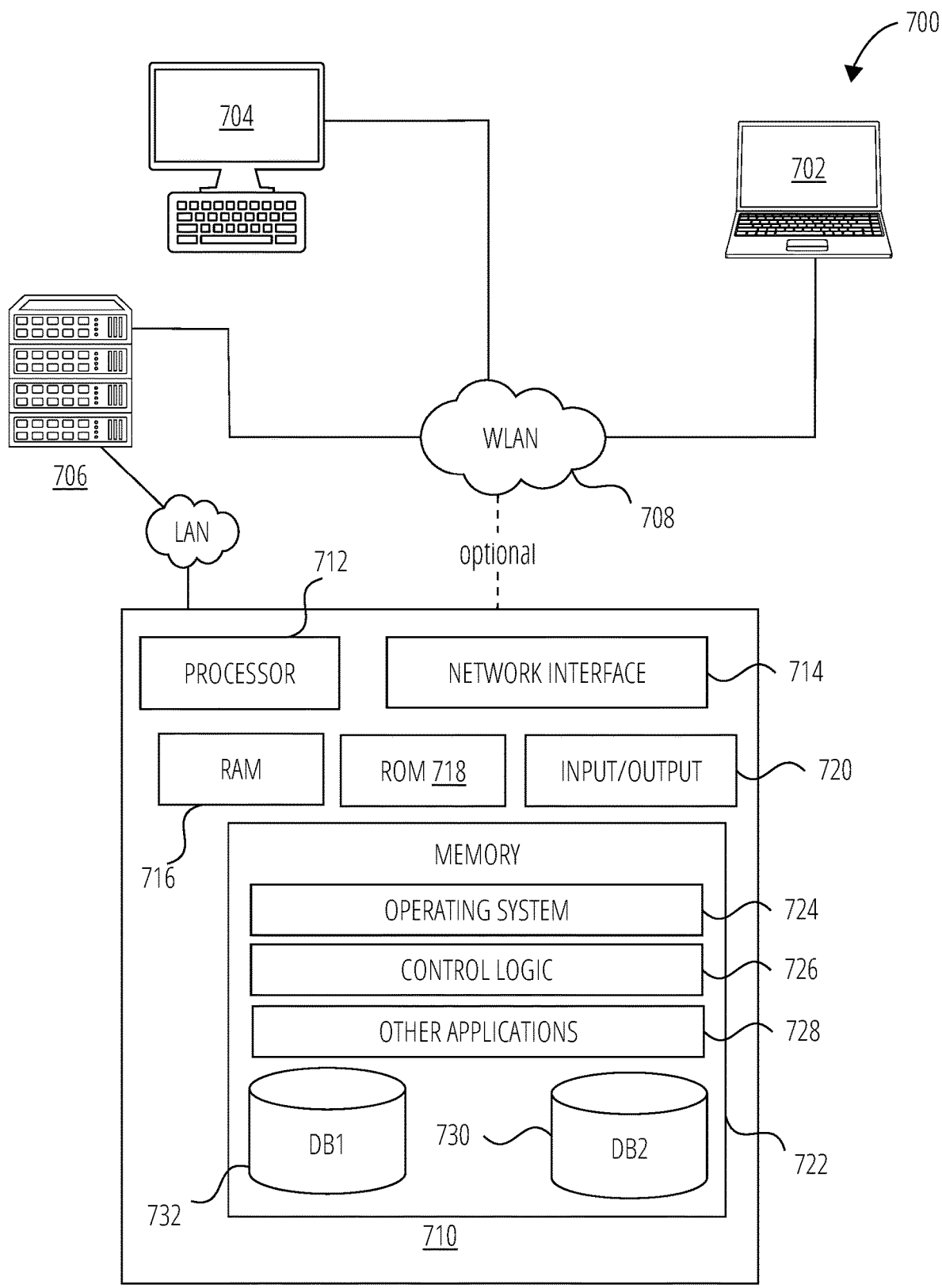
FIG. 7 depicts a system architecture and data processing device 700 that may be used in accordance with one or more illustrative aspects described herein.

FIG. 7 illustrates one example of a system architecture and data processing device 700 that may be used to implement one or more illustrative aspects described herein in a standalone and/or networked environment. Various network nodes including data server 710, web server 706, computer 704, and laptop 702 may be interconnected via a wide area network 708 (WAN), such as the internet. Other networks may also or alternatively be used, including private intranets, corporate networks, local area networks (LANs), metropolitan area networks (MANs) wireless networks, personal networks (PANs), and the like. Network 708 is for illustration purposes and may be replaced with fewer or additional computer networks. A LAN may have one or more of any known LAN topology and may use one or more of a variety of different protocols, such as ethernet. Devices including data server 710, web server 706, computer 704, laptop 702 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components of the system architecture and data processing device 700 may include data server 710, web server 706, and client computer 704, laptop 702. Data server 710 provides overall access, control and administration of databases and control software for performing one or more illustrative aspects described herein. Data server 710 may be connected to web server 706 through which users interact with and obtain data as requested. Alternatively, data server 710 may act as a web server itself and be directly connected to the internet. Data server 710 may be connected to web server 706 through the network 708 (e.g., the internet), via direct or indirect connection, or via some other network. Users may interact with the data server 710 using remote computer 704, laptop 702, e.g., using a web browser to connect to the data server 710 via one or more externally exposed web sites hosted by web server 706. Client computer 704, laptop 702 may be used in concert with data server 710 to access data stored therein or may be used for other purposes. For example, from client computer 704, a user may access web server 706 using an internet browser, as is known in the art, or by executing a software application that communicates with web server 706 and/or data server 710 over a computer network (such as the internet).

Servers and applications may be combined on the same physical machines, and retain separate virtual or logical addresses, or may reside on separate physical machines. FIG. 7 illustrates just one example of a network architecture that may be used, and those of skill in the art will appreciate that the specific network architecture and data processing devices used may vary, and are secondary to the functionality that they provide, as further described herein. For example, services provided by web server 706 and data server 710 may be combined on a single server.

Each component including data server 710, web server 706, computer 704, laptop 702 may be any type of known computer, server, or data processing device. Data server 710, e.g., may include a processor 712 controlling overall operation of the data server 710. Data server 710 may further include random access memory RAM 716, read only memory ROM 718, network interface 714, input/output interfaces 720 (e.g., keyboard, mouse, display, printer, etc.), and memory 722. Input/output interfaces 720 may include a variety of interface units and drives for reading, writing, displaying, and/or printing data or files. Memory 722 may further store operating system software 724 for controlling overall operation of the data server 710, control logic 726 for instructing data server 710 to perform aspects described herein, and other application software 728 providing secondary, support, and/or other functionality which may or may not be used in conjunction with aspects described herein. The control logic may also be referred to herein as the data server software control logic 726. Functionality of the data server software may refer to operations or decisions made automatically based on rules coded into the control logic, made manually by a user providing input into the system, and/or a combination of automatic processing based on user input (e.g., queries, data updates, etc.).

Memory 722 may also store data used in performance of one or more aspects described herein, including a first database 730 and a second database 732. In some embodiments, the first database may include the second database (e.g., as a separate table, report, etc.). That is, the information may be stored in a single database, or separated into different logical, virtual, or physical databases, depending on system design. Web server 706, computer 704, laptop 702 may have similar or different architecture as described with respect to data server 710. Those of skill in the art will appreciate that the functionality of data server 710 (or web server 706, computer 704, laptop 702) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution or may be written in a scripting language such as (but not limited to) hypertext markup language (HTML) or extensible markup language (XML). The computer executable instructions may be stored on a computer readable medium such as a non-volatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). various aspects described herein may be embodied as a method, a data processing system, or a computer program product. Therefore, various functionalities may be embodied in whole or in part in software, firmware and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

FIG. 8-FIG. 11 illustrate electrical and mechanical aspects of one embodiment of a rectangular LED board for use during germination. These details are intended for illustrative purposes and are not meant to limit the scope of this disclosure in any way. It will be well understood by one skilled in the art how the disclosed solution may be implemented using configurations similar to that illustrated, as well as other configurations capable of providing the illumination variation described herein.

FIG. 8 illustrates exemplary electro-optical performance characteristics for a rectangular LED board for use during germination 800 in accordance with one embodiment. These characteristics may be based on the type and number of LEDs used on the board and may be used to determine design decisions such as spacing and number of LEDs employed. Luminous flux may indicate how much overall light a lighting channel may produce with all LEDs in the channel turned fully on. Color temperature may indicate the wavelengths available given the LEDs used. Color rendering index (CRI) may give an indication of how closely the available LEDs may adhere to the wavelength they are designed to produce, as some variation may be expected from LED to LED based on physical semiconductor properties. Voltage and current parameters may indicate how much power a board may use as designed with all LEDs turned completely on to their highest level of intensity. Power consumption may indicate how much energy a lighting channel may be expected to consume, and, with some efficiency losses, emit as photons, at peak performance. Viewing angle may be a property of the LEDs used, and may determine how LEDs are spaced on a board in order to provide uniform coverage across a channel in one embodiment or indicate how a channel may be designed to focus light on specific areas in another embodiment.

Figure 9:
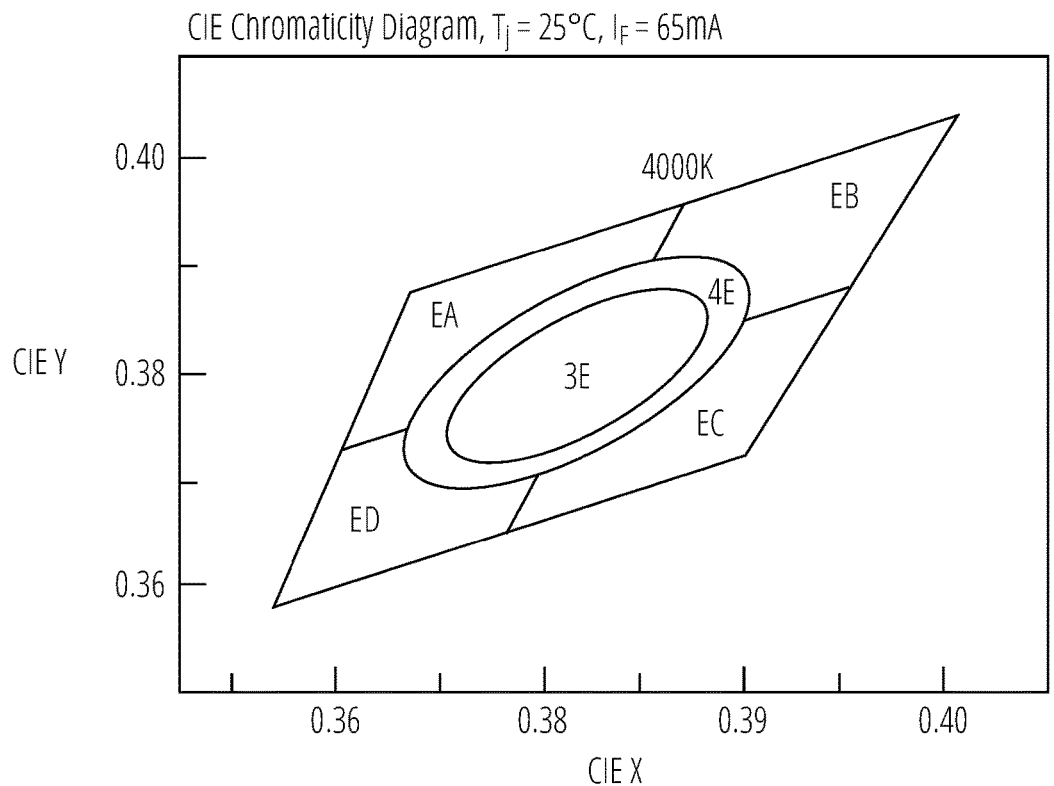
FIG. 9 illustrates an exemplary color bin structure for a rectangular LED board for use during germination 900 in accordance with one embodiment.

FIG. 9 illustrates an exemplary color bin structure for a rectangular LED board for use during germination 900 in accordance with one embodiment.

Figure 10:
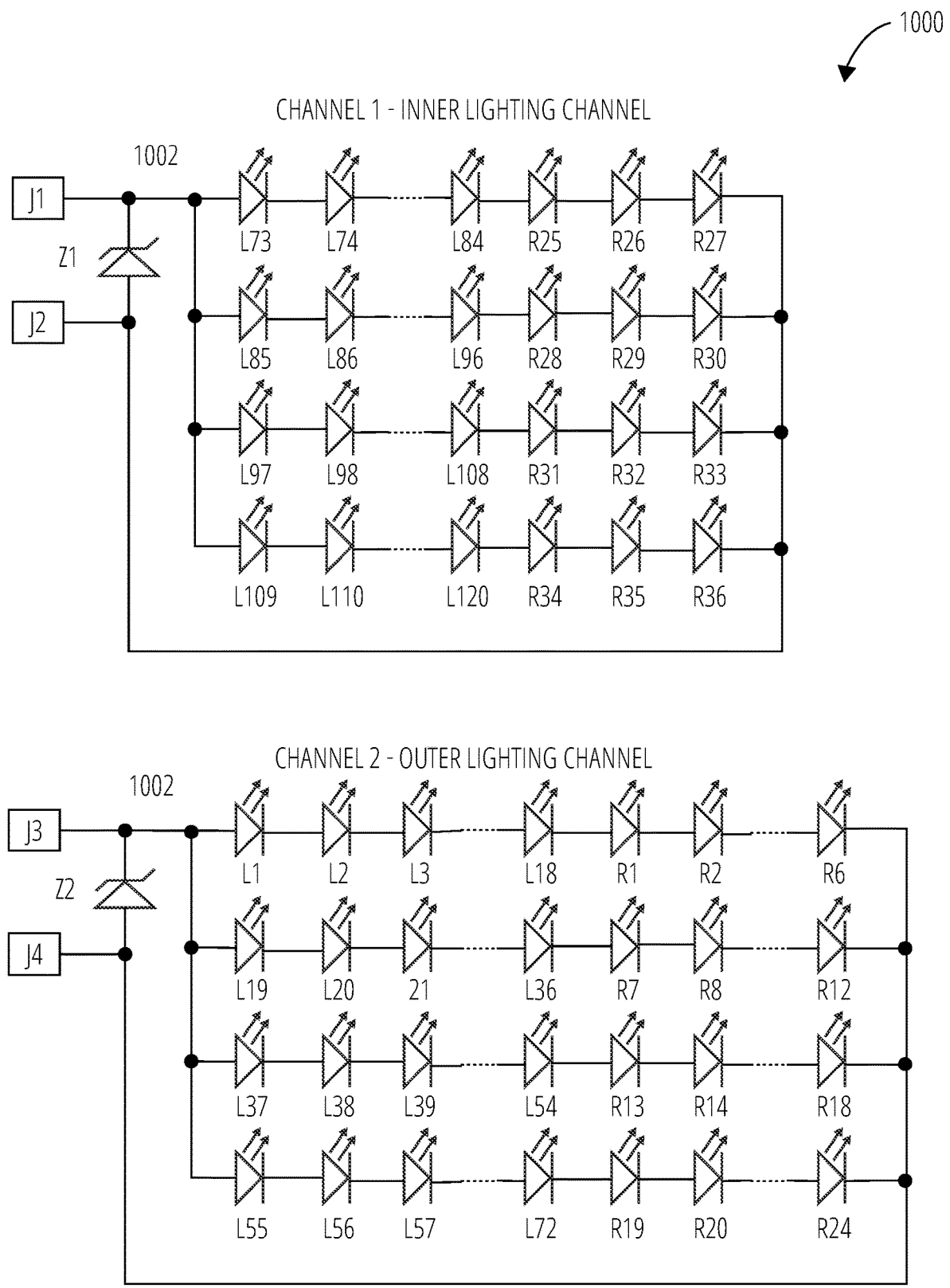
FIG. 10 illustrates an exemplary circuit diagram for a rectangular LED board for use during the germination stage 1000 in accordance with one embodiment.

FIG. 10 illustrates an exemplary circuit diagram for a rectangular LED board for use during the germination stage 1000 in accordance with one embodiment. Connectors J1 and J2 may provide power and control signals via power signal lines 1002 to the inner lighting channel, channel 1, comprising LEDs L73-L120 and R25-R36. In one embodiment, L73-L120 may be forty-eight white LEDs and R25-R36 may be twelve red LEDs. Diode Z1 may provide isolation and overvoltage protection between the signal paths between J1 and J2 and the LEDs connected to them.

Connectors J3 and J4 may provide power and control signals via power signal lines 1002 to the outer lighting channel, channel 2, comprising LEDs L1-L72 and R1-R24. In one embodiment, L1-L72 may be seventy-two white LEDs and R1-R24 may be twenty-four red LEDs. Diode Z2 may provide isolation and overvoltage protection between the signal paths between J3 and J4 and the LEDs connected to them.

Figure 11:
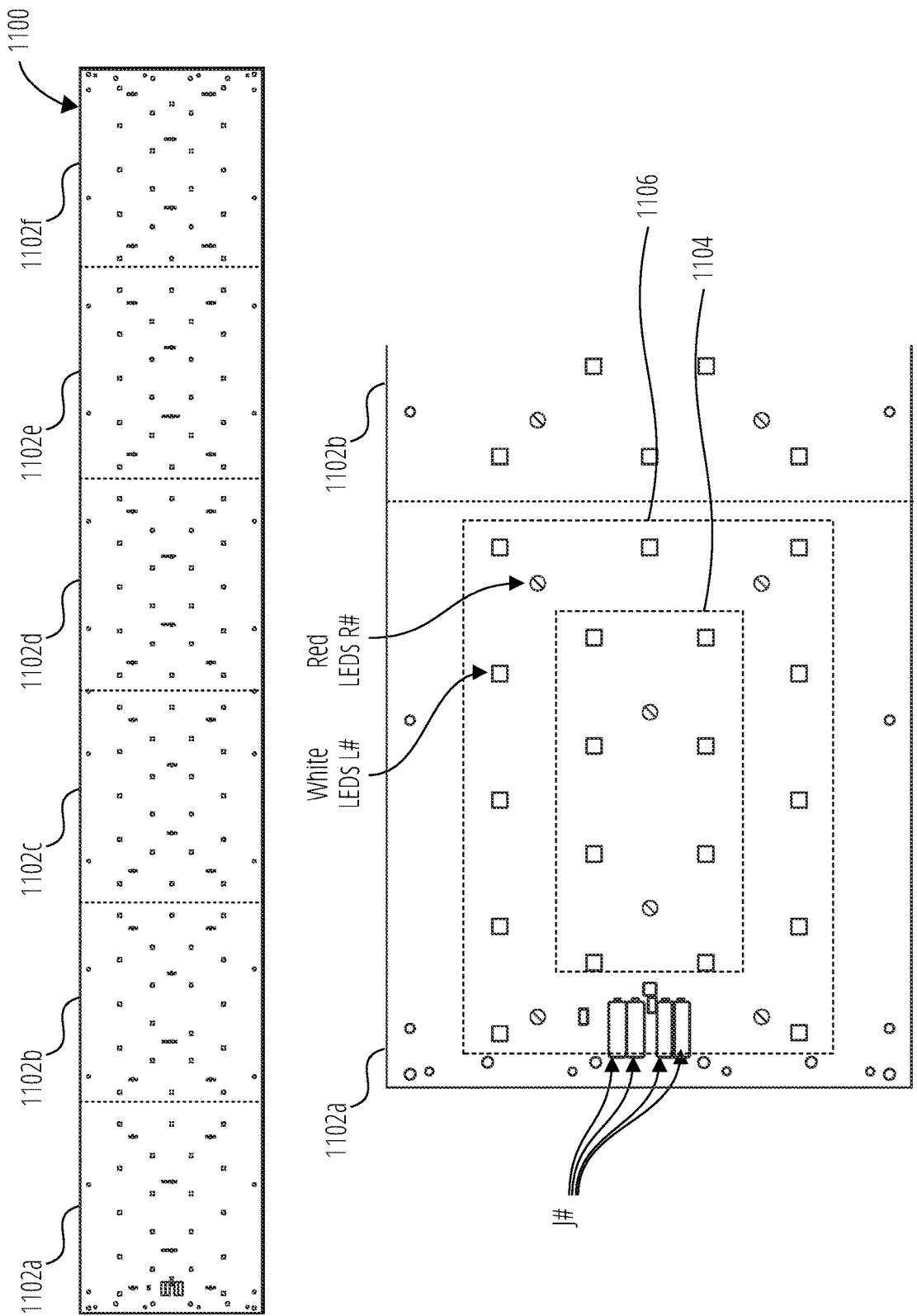
FIG. 11 illustrates an exemplary mechanical layout drawing for a germination lighting array of rectangular LED boards for use during the germination stage 1100 in accordance with one embodiment.

FIG. 11 illustrates an exemplary mechanical layout drawing for a germination lighting array of rectangular LED boards for use during the germination stage 1100 in accordance with one embodiment. A number of LED boards such as the exemplary rectangular LED board exemplary rectangular LED boards for use during germination 1102a-1102f may be combined to illuminate germinating seedlings along a growing stand or rack.

The exemplary mechanical layout drawing for a germination lighting array of rectangular LED boards for use during the germination stage 1100 may comprise the components illustrated in the exemplary circuit diagram for a rectangular LED board for use during the germination stage 1000 introduced above. Connectors J1-4 may be located as indicated by the J # elements of the exemplary rectangular LED board for use during germination 1102a. LEDs L1-120 may be distributed across the boards of the array as shown by the elements indicated as LEDs L #. LEDs R1-36 may be distributed across the boards of the array as shown by the elements of exemplary rectangular LED board for use during germination 1102a indicated as LEDs R #. These LEDs may be arranged in an inner germination LED placement pattern 1104 and an outer germination LED placement pattern 1106 in one embodiment as indicated.

Figure 12:
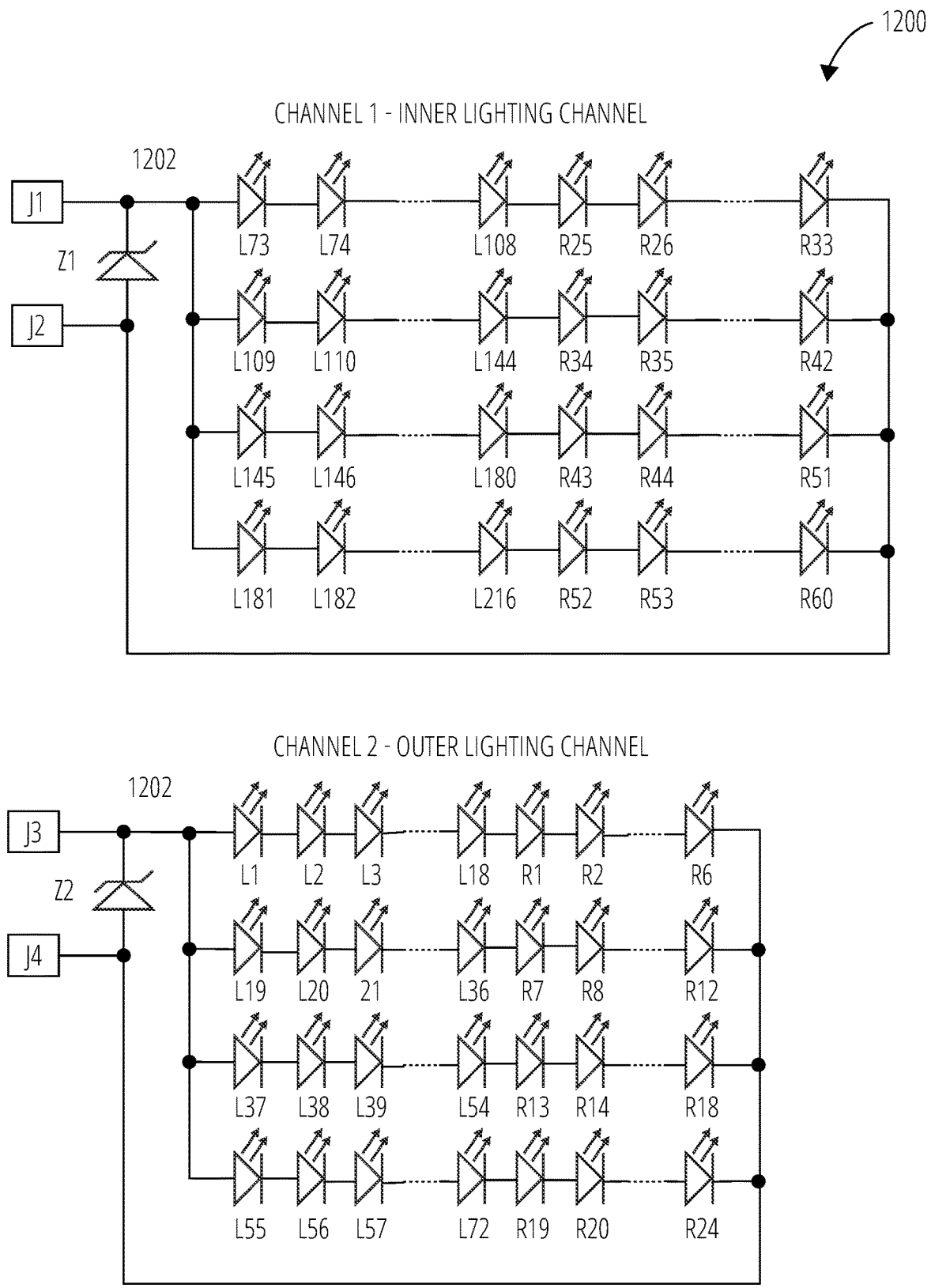
FIG. 12 illustrates an exemplary circuit diagram for a rectangular LED board for use during the nursery stage 1200 in accordance with one embodiment.

FIG. 12 illustrates an exemplary circuit diagram for a rectangular LED board for use during the nursery stage 1200 in accordance with one embodiment. Connectors J1 and J2 may provide power and control signals via power signal lines 1202 to the inner lighting channel, channel 1, comprising LEDs L73-L216 and R25-R60. In one embodiment, L73-L216 may be one hundred and forty-four white LEDs and R25-R60 may be thirty-six red LEDs. Diode Z1 may provide isolation and overvoltage protection between the signal paths between J1 and J2 and the LEDs connected to them.

Connectors J3 and J4 may provide power and control signals via power signal lines 1202 to the outer lighting channel, channel 2, comprising LEDs L1-L72 and R1-R24. In one embodiment, L1-L72 may be seventy-two white LEDs and R1-R24 may be twenty-four red LEDs. Diode Z2 may provide isolation and overvoltage protection between the signal paths between J3 and J4 and the LEDs connected to them.

Figure 13:
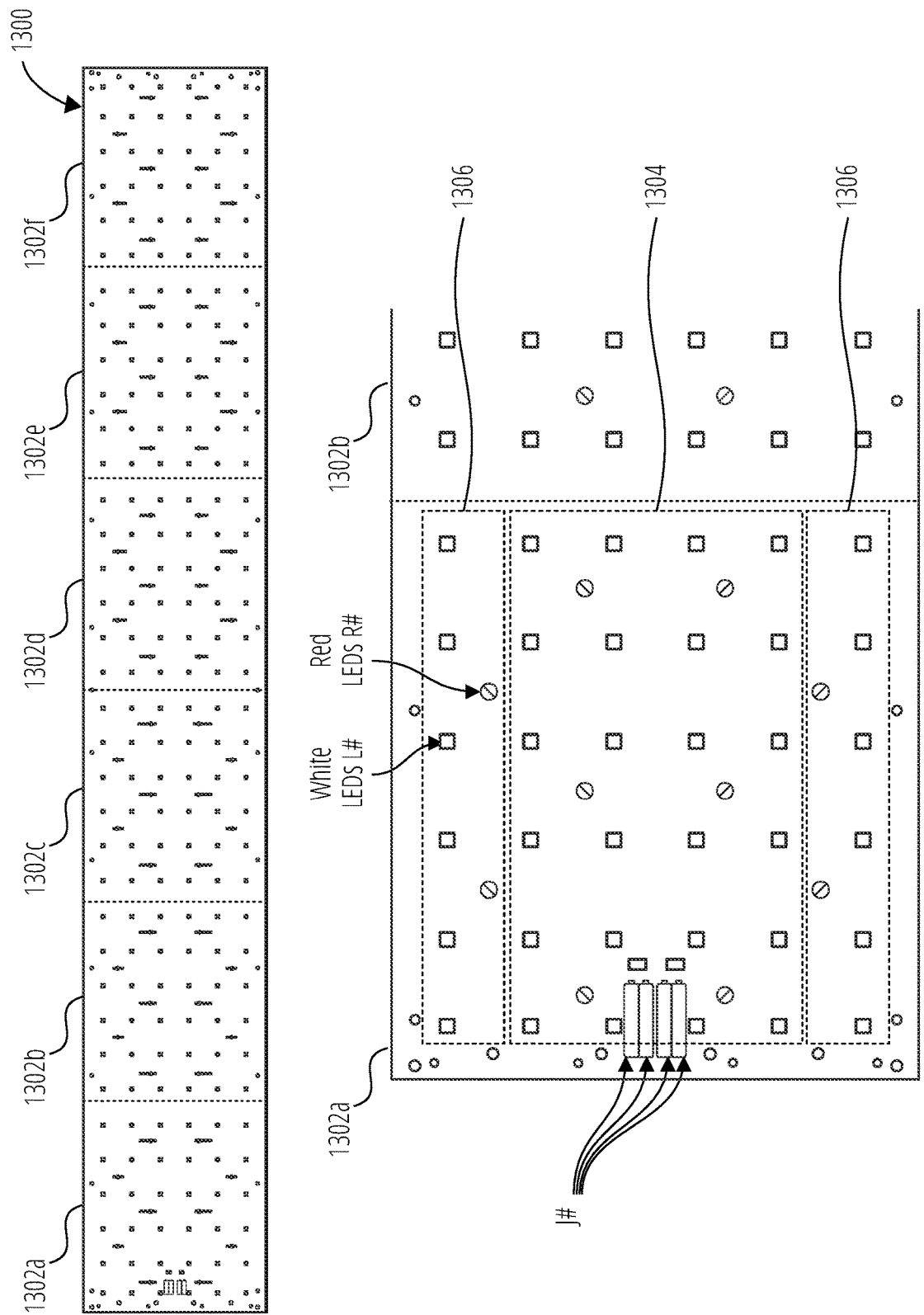
FIG. 13 illustrates an exemplary mechanical layout drawing for a nursery lighting array of rectangular LED boards for use during germination 1300 in accordance with one embodiment.

FIG. 13 illustrates an exemplary mechanical layout drawing for a nursery lighting array of rectangular LED boards for use during germination 1300 in accordance with one embodiment. A number of LED boards such as the exemplary rectangular LED boards for use during the nursery stage 1302a-1302f may be combined to illuminate germinating seedlings along a growing stand or rack.

The exemplary mechanical layout drawing for a nursery lighting array of rectangular LED boards for use during germination 1300 may comprise the components illustrated in the exemplary circuit diagram for a rectangular LED board for use during the germination stage 1000 introduced above. Connectors J1-J4 may be located as indicated by the J # elements of the exemplary rectangular LED board for use during the nursery stage 1302a. LEDs L1-120 may be distributed across the boards of the array as shown by the elements indicated as LEDs L #. LEDs R1-36 may be distributed across the boards of the array as shown by the elements of exemplary rectangular LED board for use during the nursery stage 1302a indicated as LEDs R #. These LEDs may be arranged in an inner nursery LED placement pattern 1304 and an outer nursery LED placement pattern 1306 in one embodiment as indicated.

Figure 14:
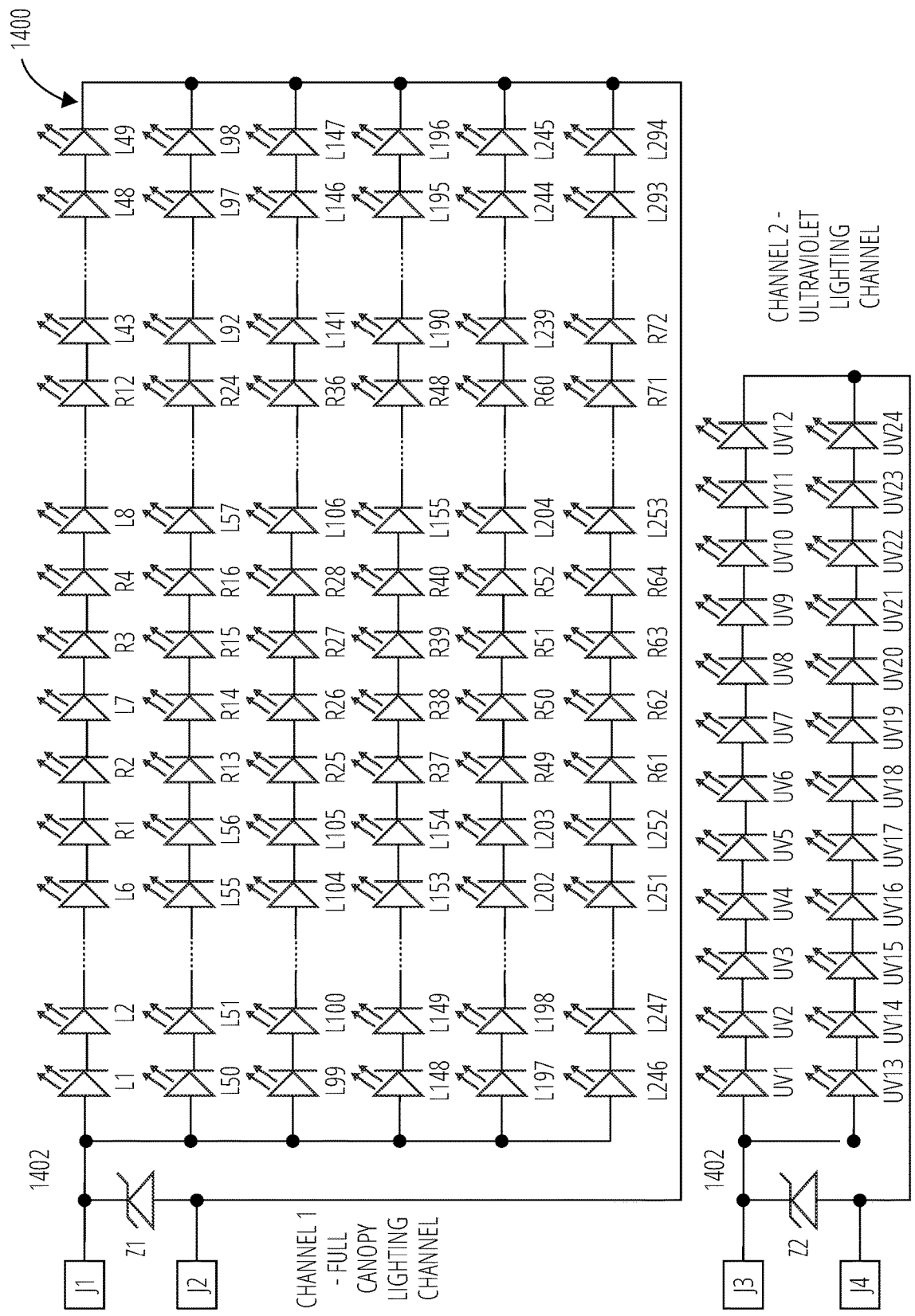
FIG. 14 illustrates an exemplary circuit diagram for a rectangular LED board for use during the finishing stage 1400 in accordance with one embodiment.

FIG. 14 illustrates an exemplary circuit diagram for a rectangular LED board for use during the finishing stage 1400 in accordance with one embodiment. Connectors J1 and J2 may provide power and control signals via power signal lines 1402 to a full canopy lighting channel, channel 1, comprising LEDs L1-L294 and R1-R72. In one embodiment, L1-L294 may be white LEDs and R1-R72 may be red LEDs. Diode Z1 may provide isolation and overvoltage protection between the signal paths between J1 and J2 and the LEDs connected to them.

Connectors J3 and J4 may provide power and control signals via power signal lines 1402 to an ultraviolet lighting channel, channel 2, comprising LEDs UV1-UV24. In one embodiment, UV1-UV24 may be ultraviolet light spectrum LEDs. Diode Z2 may provide isolation and overvoltage protection between the signal paths between J3 and J4 and the LEDs connected to it.

Figure 15:
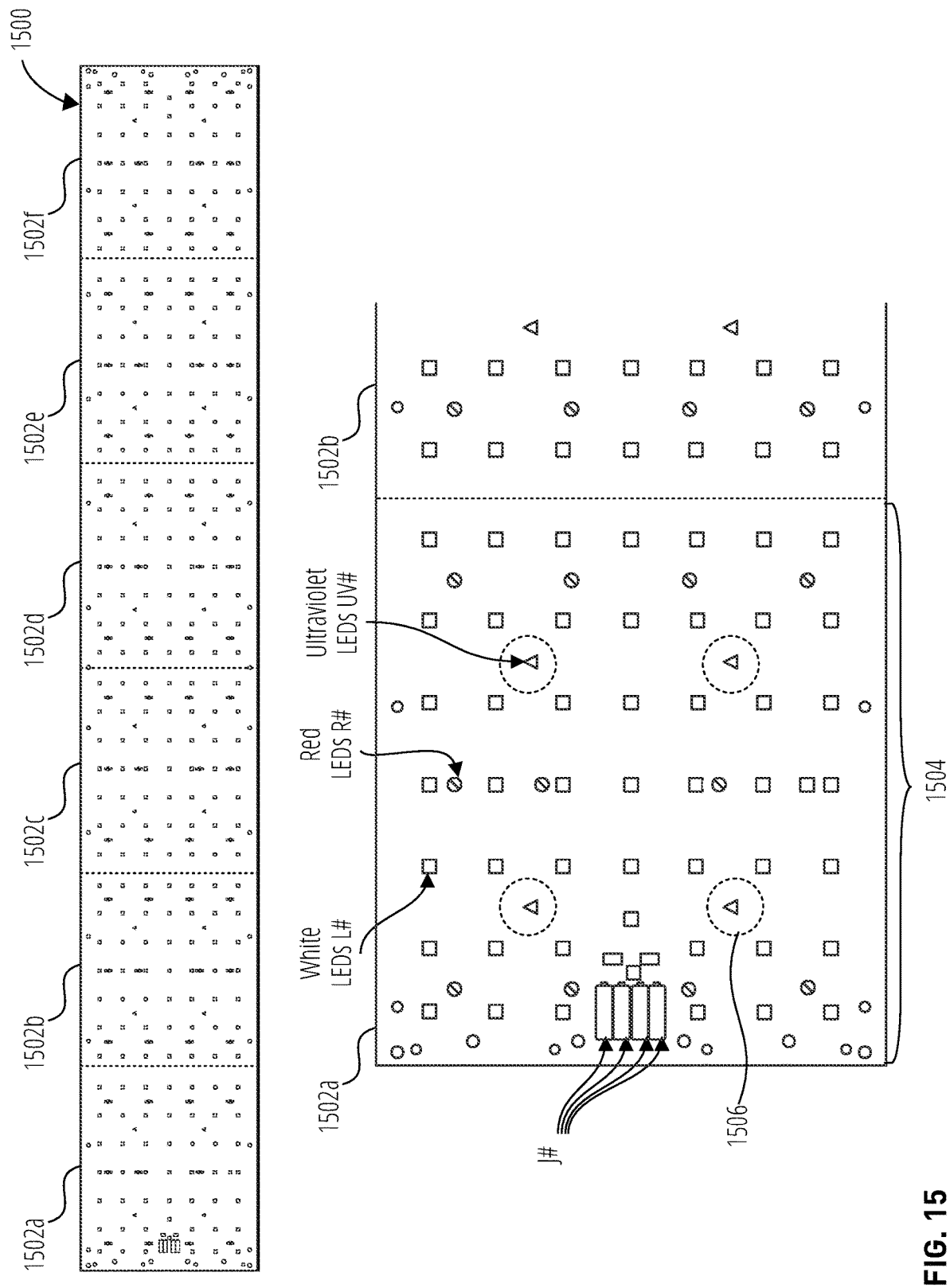
FIG. 15 illustrates an exemplary mechanical layout drawing for a finishing lighting array of rectangular LED boards for use during germination 1500 in accordance with one embodiment.

FIG. 15 illustrates an exemplary mechanical layout drawing for a finishing lighting array of rectangular LED boards for use during germination 1500 in accordance with one embodiment. A number of LED boards such as the exemplary rectangular LED board exemplary rectangular LED boards for use during finishing 1502*a*-1502*f* may be combined to illuminate germinating seedlings along a growing stand or rack.

The exemplary mechanical layout drawing for a finishing lighting array of rectangular LED boards for use during germination 1500 may comprise the components illustrated in the exemplary circuit diagram for a rectangular LED board for use during the germination stage 1000 introduced above. Connectors J1-4 may be located as indicated by the J # elements of the exemplary rectangular LED board for use during finishing 1502*a*. LEDs L1-120 may be distributed across the boards of the array as shown by the elements indicated as LEDs L #. LEDs R1-36 may be distributed across the boards of the array as shown by the elements of exemplary rectangular LED board for use during finishing 1502*a* indicated as LEDs R #. LEDs UV1-24 may be distributed across the boards of the array as shown by the elements of exemplary rectangular LED board for use during finishing 1502*a* indicated as LEDs UV #. These LEDs may be arranged in a full canopy LED placement pattern 1504 and an ultraviolet LED placement pattern 1506 in one embodiment as indicated.

Figure 16:
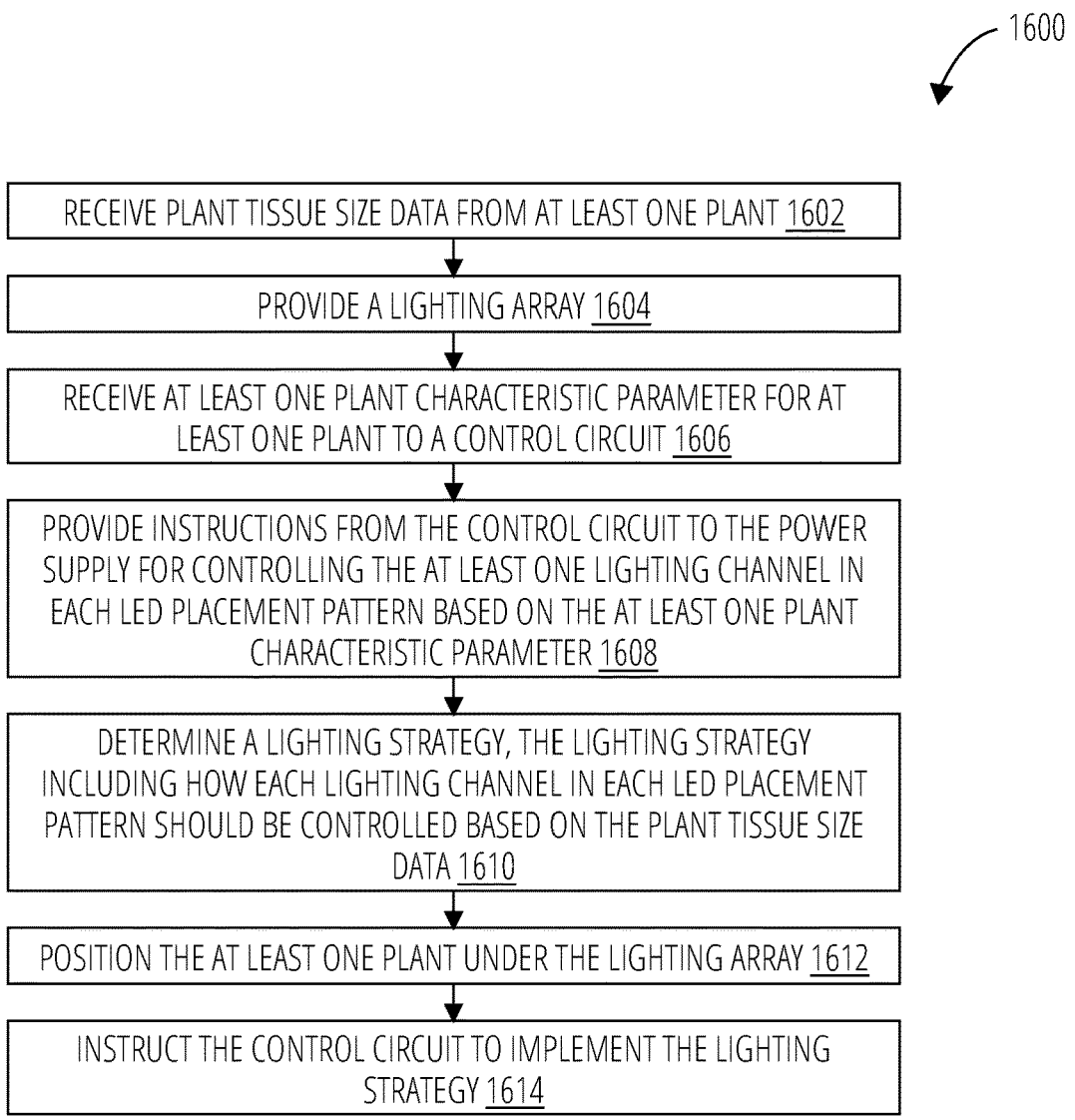
FIG. 16 illustrates a routine 1600 in accordance with one embodiment.

FIG. 16 illustrates a routine 1600 for using a lighting during various plant growth stages in accordance with one embodiment. In block 1602, plant tissue size data may be received for at least one plant. The data may be collected by an imaging system as previously described, or be detected in some other manner, such as visually, by weight, etc.

In block 1604, a lighting array may be provided. The lighting array may include an LED board and a plurality of LEDs. The plurality of LEDs may be arranged in a plurality of LED placement patterns, including groups of the plurality of LEDs, wherein each LED placement pattern is positioned to provide light to the at least one plant. The lighting array may include at least one lighting channel, wherein each LED placement pattern includes at least one LED associated with the at least one lighting channel. The lighting array may further include a power supply sufficient to drive the plurality of LEDs and control the at least one lighting channel of each LED placement pattern. Finally, the lighting array may include a control circuit connected to the power supply.

In block 1606, at least one plant characteristic parameter may be received to the control circuit for at least one plant.

In block 1608, instructions may be provided from the control circuit to the power supply for controlling the at least one lighting channel in each LED placement pattern based on the at least one plant characteristic parameter.

In block 1610, a lighting strategy may be determined. The lighting strategy may include how each lighting channel in each LED placement pattern may be controlled based on the plant tissue size data. In block 1612, at least one plant may be positioned under the lighting array. In block 1614, the control circuit may be instructed to implement the lighting strategy.

Figure 17:
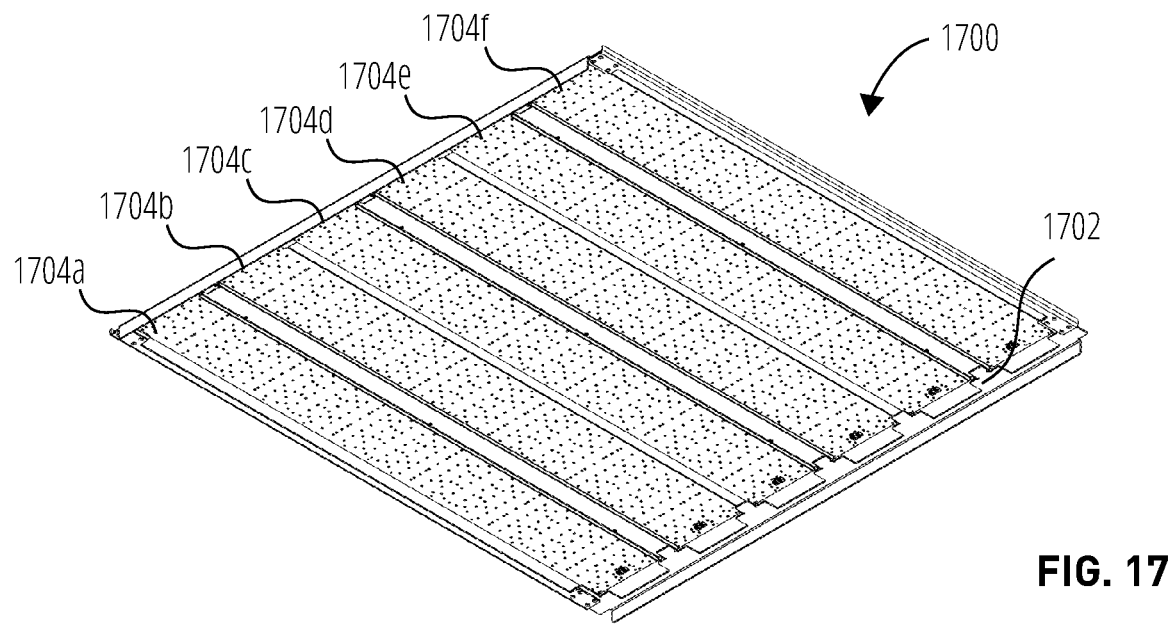
FIG. 17 illustrates a light tray 1700 in accordance with one embodiment.

FIG. 17 illustrates a light tray 1700 in accordance with one embodiment. The light tray 1700 may have an underside 1702 intended as the side of the light tray 1700 proximal to plants in a growing environment. At least one lighting array, such as lighting array lighting arrays 1704*a*-1704*f*, may be mounted on the underside 1702, such that the LEDs positioned on the lighting arrays may emit light onto plants in the growing environment.

Figure 18:
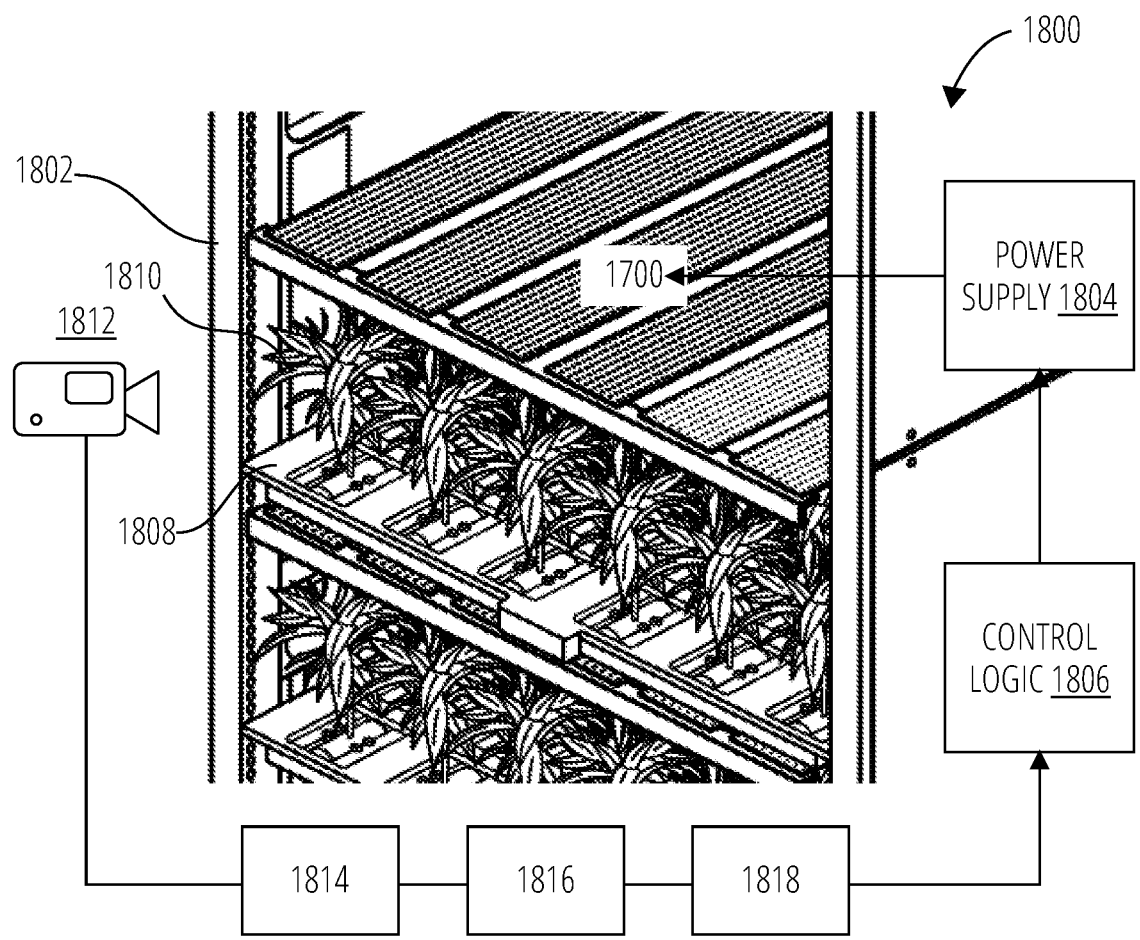
FIG. 18 illustrates a lighting system in a grow module 1800 in accordance with one embodiment.

FIG. 18 illustrates a lighting system in a grow module 1800 in accordance with one embodiment. The lighting system in a grow module 1800 may comprise a grow module 1802, in which may be mounted multiple light trays 1700. "Grow module" in this disclosure refers to a storage medium for a plurality of growing trays to be extracted and inserted by the fertigation system. The light trays 1700 may each comprise at least one lighting array, each lighting array comprising at least one LED placement pattern and at least one lighting channel.

Each of the light trays 1700 may connect to at least one power supply 1804 and at least one control logic 1806 module. The power supply 1804 may be configured to selectively provide power to the power signal lines of the light trays 1700. The control control logic 1806 module may be connected to the power supply 1804, and may be configured to selectively instruct the power supply 1804 to provide the power to drive the at least one lighting channel in each LED placement pattern.

In one embodiment, the light trays 1700 of the lighting system in a grow module 1800 may be mounted above grow trays 1808 in which plants 1810 may be grown. A camera 1812 may be used periodically to inspect the plants 1810 and transmit imaging data 1814. In one embodiment, the imaging data 1814 may be transmitted to a system architecture and data processing device 700 such as was introduced with respect to FIG. 7. In another embodiment, the imaging data 1814 may be transmitted directly to the control logic 1806. The imaging data 1814 may be processed to determine at least one plant characteristic parameter 1816, such as plant tissue size data 1818. Plant characteristic parameters 1816 such as plant tissue size data 1818, as detected through the imaging data 1814, may be used by the control logic 1806 to determine how to selectively instruct the power supply 1804 on which lighting channels and LED placement patterns are to be turned on. In one embodiment, the camera 1812 may periodically capture imaging data 1814. For example, imaging data 1814 may be collected at least once a day.

Figure 19:
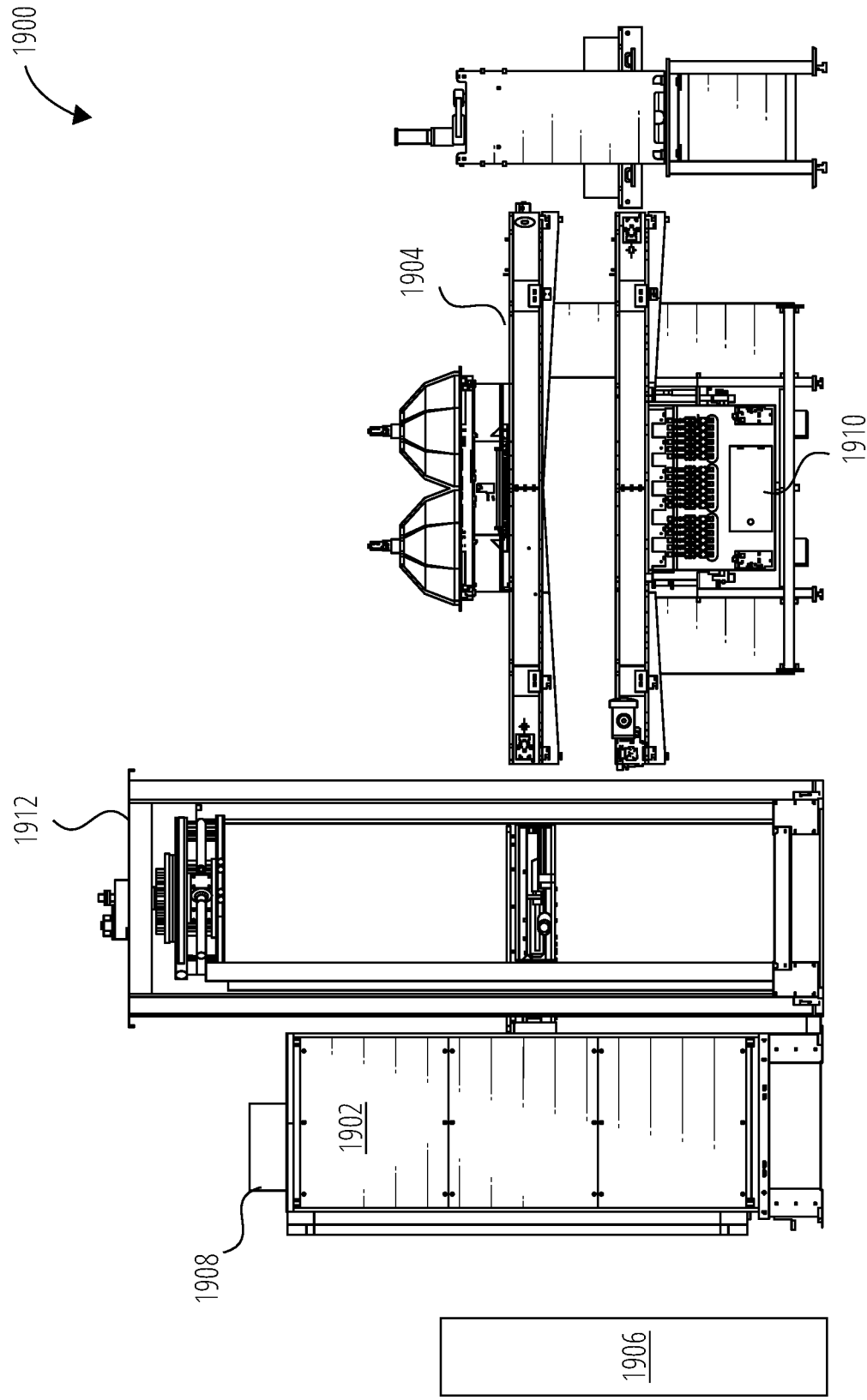
FIG. 19 illustrates a control system 1900 in accordance with one embodiment.

Referring to FIG. 19, an exemplary control system 1900 is illustrated. To provide a means to control at least the electrical or other means to send power to a motor to various fertigation system components, the control system 1900 is disclosed. The control system 1900 comprises a panel with electrical wiring and switches, typically contained within a secured metal enclosure or other container for shielding electrical wiring, switches and similar components for passing electrical power to other components such as drive mechanisms, pumps, and so forth, such as may be included in a stand alone cabinet, as indicated by control system 1906. In one embodiment, the control system 1900 may comprise panels with electrical wiring and switches in multiple locations, including but not limited to, the grow module 1902, as indicated by control system 1908, the fertigation station, as indicated by control system 1910, the load/unload station (not pictured), and the automated guided vehicle (AGV) (not pictured), for purposes of efficiency and balancing of electrical load between power usage specific to the grow module 1902 (e.g., for lighting, fans, and so forth as previously discussed), the fertigation station, the load/unload station, and the AGV. The control system 1900 may additionally be configured manually by an operator or by automated or manual means under control of software able to send and receive commands to and from the control system 1900. Any means may be used for passing said commands to/from an electrical control system 1900 (e.g., containing a power source and electrical wiring and switches) as presently described.

Control System

"Control system" in this disclosure refers to a device including a processor, logic, electrical wiring, switches, and similar components, for controlling and passing electrical power to other components or devices. This may be housed within a secure enclosed container, typically metal or plastic, for shielding these components. In one embodiment, the control system may synchronize and optimize all aspects of the environment across the automated growing facility. This may be accomplished to meet plant needs with precision for optimal plant experience, growth, and harvest yield. The control system may receive sensor inputs indicating temperature, airflow, humidity, carbon dioxide levels, and other ambient or environmental variables in the growing chambers or other parts of the automated growing facility. The control system may adjust heating, ventilation, and air conditioning (HVAC) operation in order to counter, maintain, or enhance conditions indicated by sensor inputs. "Sensor" in this disclosure refers to one or more sensing devices able to detect precise measurements of light, temperature, humidity, and/or other conditions of its surrounding environment.

In one embodiment, the control system may instruct the grow module transport devices to locate specific modules based on their machine-readable identification applied to each grow module. "Machine-readable identification" in this disclosure refers to a graphic or visible identifier able to be interpreted without human interaction. Exemplary machine-readable identification includes radio frequency identifier (RFID) or near field communication (NFC) devices, barcodes and quick response codes. The control system may also provide the grow module transport devices with the grow module's known location, known time elapsed since plants in a grow module were last fertigated, or other parameters. The control system may thus instruct a grow module transport device to find specific grow modules and transport them to appropriate stations based on algorithms or protocols determined for facility operation, and based on known locations of stations throughout the facility.

In one embodiment, the control system may receive information on the type of plants intended to be fertigated, the phase of growth plants within a grow module have reached, based on time elapsed since planting, images captured of the plants, or other data. Based on this data, a nutrient input system may distribute desired levels of desired nutrients into the mixing tank. The control system may control an amount of fresh water mixed with the nutrients, a duration of mixing, and the addition of other elements. The control system may instruct a pump to move the nutrient/water mixture from the mixing tank to a day tank or a tank for immediate use at the fertigation station. Based on machine-readable identification for a grow module brought to the fertigation station, as well as machine-readable identification for growing trays pulled from the grow module for fertigation, the control system may control the timing, speed, and duration of operation for a pump delivering the nutrient/water mixture to the nozzle (deleted) manifold.

In one embodiment, the control system may control the operation of the fertigation gantry lift, the tray movement system, the upper conveyor and lower conveyor, the camera tunnel or imaging station (having at least one camera) and the tray elevator of the fertigation station. In this manner, based on weight or location sensors in one embodiment, the control system may control the movement of growing trays as they are removed from the grow module, placed on the conveyors, imaged, fertigated, and returned to the grow module. The control system may read a machine-readable identification provided on the growing tray, as well as imaging data captured by the at least one camera, to determine the motion, speeds, durations, etc., for which each growing tray may be handled with optimal consideration for the needs of the seeds, seedlings, shoots of plants, or plants disposed within that growing tray. As indicated by the weight of plant vessels or other considerations, the control system may instruct a vessel clamping system operating in concert with the injection system such that plant vessels are secured and will not dislodged from or disrupted within their growing tray during fertigation.

In one embodiment, the control system may receive input from sensors within the grow module, indicating temperature, humidity, airflow, or other conditions within the grow module. Based these inputs, in conjunction with known time elapsed since planting, imaging data for plants within the growing trays of the grow module, and/or other parameters, the control system may control a ventilation system for the grow module, as well as lighting channels powering LED patterns in the lighting arrays of the light trays within the grow module. In this manner and as previously described, conditions experienced by seeds, seedlings, shoots of plants, and plants within the automated growing facility, such as temperature, humidity, airflow, carbon dioxide levels, water, nutrients, light intensity, wavelength, and exposure, and more, may be controlled across the facility and down to a tray-by-tray or plant-by-plant granularity by the automated growing facility's control system.

Various functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure may be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, claims in this application that do not otherwise include the "means for" [performing a function] construct should not be interpreted under 35 U.S.C § 112(f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" may be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

Having thus described illustrative embodiments in detail, it will be apparent that modifications and variations are possible without departing from the scope of the disclosure as claimed. The scope of disclosed subject matter is not limited to the depicted embodiments but is rather set forth in the following Claims.

What is claimed is:

1. A method, comprising:
receiving plant tissue size data from at least one plant;
providing a lighting array, the lighting array including:
a light emitting diode (LED) board including:
a plurality of LEDs;
a plurality of LED placement patterns including groups of the plurality of LEDs, wherein each LED placement pattern is positioned to provide light to the at least one plant;
at least one lighting channel, wherein each LED placement pattern includes at least one LED associated with the at least one lighting channel; and
power signal lines configured to drive the plurality of LEDs and control the at least one lighting channel of each LED placement pattern;
providing a power supply sufficient to drive the plurality of LEDs and control the at least one lighting channel of each LED placement pattern;
providing a control circuit connected to the power supply, the control circuit configured to:
receive at least one plant characteristic parameter for at least one plant; and
provide instructions to the power supply for controlling the at least one lighting channel in each LED placement pattern based on the at least one plant characteristic parameter;
providing at least one light tray, wherein the at least one lighting array is mounted on an underside of the at least one light tray;
providing a grow module, the grow module comprising:
the at least one light tray; and
at least one growing tray adapted to hold at least one plant vessel, the growing tray comprising:
a plurality of tray insert openings configured to accept a plurality of tray inserts, the plurality of tray inserts, each comprising:
a plurality of tray locking points configured to secure each of the plurality of tray inserts within the plurality of tray insert openings;
a vessel cavity configured to hold a plant vessel; and
a plurality of plant vessel securement points configured to secure the at least one plant vessel within the vessel cavity;
wherein the grow module is configured to hold the at least one growing tray and the at least one light tray in a vertically stacked configuration with the at least one light tray disposed over the at least one growing tray;
providing a plurality of fertigation holes on a bottom of the vessel cavity configured to receive fertigation needles,
providing a fertigation system including:
a tray movement system for extracting the growing tray from the grow module and placing the growing tray back into the grow module;
a tray elevator for lowering and raising the growing tray;
a first pump in fluid communication with a fresh water supply; and
a nozzle manifold in fluid communication with at least one of the first pump and the fresh water supply, the nozzle manifold comprising:
a manifold header; and
a plurality of nozzles in fluid communication with the manifold header, wherein the plurality of nozzles are configured with the fertigation needles that pass through the fertigation holes to inject at least one of nutrients supplied by the first pump and water from the fresh water supply into the at least one plant vessel on the growing tray;

passing the fertigation needles through the fertigation holes on the bottom of the vessel cavity;
injecting the at least one of nutrients supplied by the first pump and water from the fresh water supply into the at least one plant vessel on the growing tray;
determining a lighting strategy, the lighting strategy including how each lighting channel in each LED placement pattern should be controlled based on the plant tissue size data;
positioning the at least one plant, in the grow module, under the lighting array; and
instructing the control circuit to implement the lighting strategy.

2. The method of claim 1, further comprising:
providing the lighting array configured as a germination lighting array comprising:
  an inner LED placement pattern configured to illuminate the at least one plant during a first part of a germination stage;
  an outer LED placement pattern configured to illuminate the at least one plant during a second part of the germination stage in conjunction with the inner LED placement pattern;
  a first lighting channel configured to control the inner LED placement pattern;
  and a second lighting channel configured to control the outer LED placement pattern;
  positioning at least one plant developed to the germination stage under the germination lighting array; and
  instructing the control circuit to implement a germination lighting strategy, wherein the germination lighting strategy comprises:
powering the first lighting channel during the first part of the germination stage; and
powering the second lighting channel and the first lighting channel during the second part of the germination stage;
wherein the first part of the germination stage and the second part of the germination stage are determined by the plant characteristic parameters of the at least one plant.

3. The method of claim 1, further comprising:
providing the lighting array configured as a nursery lighting array comprising:
  an inner LED placement pattern configured to illuminate the at least one plant during a first part of a nursery stage;
  an outer LED placement pattern configured to illuminate the at least one plant during a second part of the nursery stage in conjunction with the inner LED placement pattern;
  a first lighting channel configured to control the inner LED placement pattern;
  and a second lighting channel configured to control the outer LED placement pattern;
  positioning at least one plant developed to the nursery stage under the nursery lighting array; and
  instructing the control circuit to implement a nursery lighting strategy, wherein the nursery lighting strategy comprises:
powering the first lighting channel during the first part of the nursery stage; and
powering the second lighting channel and the first lighting channel during the second part of the nursery stage;
wherein the first part of the nursery stage and the second part of the nursery stage are determined by the plant characteristic parameters of the at least one plant.

4. The method of claim 1, further comprising:
providing the lighting array configured as a finishing lighting array comprising:
  a full canopy LED placement pattern configured to illuminate the at least one plant during a first part of a finishing stage;
  an ultraviolet LED placement pattern configured to illuminate the at least one plant during a second part of the finishing stage in conjunction with the full canopy LED placement pattern;
  a first lighting channel configured to control the full canopy LED placement pattern; and
  a second lighting channel configured to control the ultraviolet LED placement pattern;
positioning at least one plant developed to the finishing stage under the finishing lighting array; and
instructing the control circuit to implement a finishing lighting strategy, wherein the finishing lighting strategy comprises:
  powering the first lighting channel during the first part of the finishing stage; and
  powering the second lighting channel and the first lighting channel during the second part of the finishing stage;
  wherein the first part of the finishing stage and the second part of the finishing stage are determined by the plant characteristic parameters of the at least one plant.

5. The method of claim 1, further comprising:
capturing imaging data periodically during development of the at least one plant; and
adjusting the lighting strategy based on the imaging data.

6. The method of claim 5, further comprising:
capturing the imaging data at least once a day during the development of the at least one plant.

7. The method of claim 1, further comprising at least one sensor configured to detect plant growth, wherein the at least one plant characteristic parameter is the plant growth detected by the at least one sensor.

8. A system, comprising:
at least one lighting array comprising:
  at least one LED board including:
    a plurality of LEDs;
    a plurality of LED placement patterns including groups of the plurality of LEDs, wherein each LED placement pattern is positioned to provide light to at least one plant;
    at least one lighting channel, wherein each LED placement pattern includes at least one LED associated with the at least one lighting channel; and
    power signal lines configured to drive the plurality of LEDs and control the at least one lighting channel of each LED placement pattern;
at least one light tray, wherein the at least one lighting array is mounted on an underside of the at least one light tray;
a grow module comprising:
  the at least one light tray; and
  at least one growing tray adapted to hold at least one plant vessel, the growing tray comprising:
    a plurality of tray insert openings configured to accept a plurality of tray inserts, the plurality of tray inserts, each comprising:

a plurality of tray locking points configured to secure each of the plurality of tray inserts within the plurality of tray insert openings;
a vessel cavity configured to hold a plant vessel; and
a plurality of plant vessel securement points configured to secure the at least one plant vessel within the vessel cavity;
wherein the grow module is configured to hold the at least one growing tray and the at least one light tray in a vertically stacked configuration with the at least one light tray disposed over the at least one growing tray;
a plurality of fertigation holes on a bottom of the vessel cavity configured to receive fertigation needles;
a fertigation system including:
a tray movement system for extracting the growing tray from the grow module and placing the growing tray back into the grow module;
a tray elevator for lowering and raising the growing tray;
a first pump in fluid communication with a fresh water supply; and
a nozzle manifold in fluid communication with at least one of the first pump and the fresh water supply, the nozzle manifold comprising:
a manifold header; and
a plurality of nozzles in fluid communication with the manifold header, wherein the plurality of nozzles are configured with the fertigation needles that pass through the fertigation holes to inject at least one of nutrients supplied by the first pump and water from the fresh water supply into the at least one plant vessel, on the growing tray;
at least one power supply configured to selectively provide power to the power signal lines of the at least one lighting array; and
at least one control circuit connected to the at least one power supply, the control circuit configured to selectively instruct the at least one power supply to provide the power to drive the at least one lighting channel in each LED placement pattern.

9. The system of claim 8, wherein the at least one lighting array is configured as at least one of:
a germination lighting array comprising:
an inner germination LED placement pattern configured to illuminate the at least one plant during a first part of a germination stage;
an outer germination LED placement pattern configured to illuminate the at least one plant during a second part of the germination stage in conjunction with the inner LED placement pattern;
a first germination lighting channel configured to control the inner germination LED placement pattern; and
a second germination lighting channel configured to control the outer germination LED placement pattern;
a nursery lighting array comprising:
an inner nursery LED placement pattern configured to illuminate the at least one plant during a first part of a nursery stage;
an outer nursery LED placement pattern to illuminate the at least one plant during a second part of the nursery stage in conjunction with the inner LED placement pattern;

a first nursery lighting channel configured to control the inner nursery LED placement pattern; and
a second nursery lighting channel configured to control the outer nursery LED placement pattern; and
a finishing lighting array comprising:
a full canopy LED placement pattern configured to illuminate the at least one plant during a first part of a finishing stage;
an ultraviolet LED placement pattern configured to illuminate the at least one plant during a second part of the finishing stage in conjunction with the full canopy LED placement pattern;
a first finishing lighting channel configured to control the full canopy LED placement pattern; and
a second finishing lighting channel configured to control the ultraviolet LED placement pattern.

10. The system of claim 9, further comprising:
a camera configured to periodically capture imaging data for the at least one plant, wherein the imaging data is used to detect plant characteristic parameters during development of the at least one plant.

11. The system of claim 10, wherein the at least one lighting array may be configured as at least one of the germination lighting array, the nursery lighting array, and the finishing lighting array based on the plant characteristic parameters detected through the imaging data.

12. The system of claim 10, wherein a lighting strategy implemented by the at least one control circuit is adjusted based on the imaging data.

13. The system of claim 12, wherein the imaging data is captured at least once a day during the development of the at least one plant.

14. The system of claim 9, wherein the inner germination LED placement pattern comprises white LEDs and red LEDs at a ratio of at least four to one, respectively, and
wherein the outer germination LED placement pattern comprises white LEDs and red LEDs at a ratio of at least three to one, respectively.

15. The system of claim 9, wherein the inner nursery LED placement pattern comprises white LEDs and red LEDs at a ratio of at least four to one, respectively, and
wherein the outer nursery LED placement pattern comprises white LEDs and red LEDs at a ratio of at least three to one, respectively.

16. The system of claim 9, wherein the full canopy LED placement pattern comprises white LEDs and red LEDs at a ratio of at least four to one, respectively, and
the ultraviolet LED placement pattern comprises ultraviolet LEDs, the ratio of white LEDs in the full canopy LED placement pattern and the ultraviolet LEDs in the ultraviolet LED placement pattern being at least twelve to one.

17. The system of claim 8, the control circuit further configured to:
receive at least one plant characteristic parameter for the at least one plant; and
provide instructions to the power supply for controlling the at least one lighting channel in each LED placement pattern based on the at least one plant characteristic parameter.

18. The system of claim 17, further comprising at least one sensor configured to detect plant growth, wherein the at least one plant characteristic parameter is the plant growth detected by the at least one sensor.

* * * * *